US009439243B2

United States Patent
Liu et al.

(10) Patent No.: US 9,439,243 B2
(45) Date of Patent: Sep. 6, 2016

(54) MOBILE CELLULAR NETWORK BASED ON LAYERED CLOUD COMPUTING

(71) Applicant: Huawei Technologies Co., Ltd., Shenzhen, Guangdong (CN)

(72) Inventors: Sheng Liu, Shenzhen (CN); Rui Wang, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 14/161,518

(22) Filed: Jan. 22, 2014

(65) Prior Publication Data
US 2014/0133446 A1   May 15, 2014

Related U.S. Application Data

(63) Continuation of application No. PCT/CN2011/077926, filed on Aug. 2, 2011.

(51) Int. Cl.
| | |
|---|---|
| *H04W 88/12* | (2009.01) |
| *H04W 84/04* | (2009.01) |
| *H04W 84/02* | (2009.01) |
| *H04W 88/14* | (2009.01) |
| *H04W 88/16* | (2009.01) |

(52) U.S. Cl.
CPC ............ *H04W 88/12* (2013.01); *H04W 84/042* (2013.01); *H04W 84/02* (2013.01); *H04W 88/14* (2013.01); *H04W 88/16* (2013.01)

(58) Field of Classification Search
CPC ... H04W 88/12; H04W 88/14; H04W 88/16; H04W 84/042; H04W 84/02
See application file for complete search history.

(56) References Cited

U.S. PATENT DOCUMENTS

| | | | | |
|---|---|---|---|---|
| 2011/0096762 | A1 | 4/2011 | Basart | |
| 2011/0289134 | A1* | 11/2011 | de los Reyes | H04L 63/20 709/203 |
| 2011/0299537 | A1* | 12/2011 | Saraiya | H04L 61/2596 370/392 |
| 2012/0170548 | A1* | 7/2012 | Rajagopalan | H04W 36/22 370/331 |
| 2012/0221700 | A1* | 8/2012 | Dutta | H04L 43/0817 709/223 |
| 2012/0250509 | A1* | 10/2012 | Leung | H04W 76/04 370/235 |

(Continued)

FOREIGN PATENT DOCUMENTS

| | | |
|---|---|---|
| CN | 101969391 A | 2/2011 |
| CN | 101977242 A | 2/2011 |
| WO | WO 2009/155574 A1 | 12/2009 |

OTHER PUBLICATIONS

"Overview of cybersecurity information exchange (CYBEX)", Recommendation ITU-T X.1500, 32 pages.

(Continued)

*Primary Examiner* — Paul H Masur

(57) ABSTRACT

The present invention provides a new system structure of mobile cellular system based on layered cloud computing. A core network part of the system structure includes a CRG node, and an access network part includes an MC node and a DU node. The system structure proposed in the present invention is compatible with all conventional mobile air interface protocols, supports the layered cloud computing function, and is capable of providing joint signal processing and joint scheduling, flexibly allocating computing resources among nodes, and compressing the structure of the core network, so that larger network data throughput can be provided for users with lower deployment cost.

28 Claims, 12 Drawing Sheets

(56) References Cited

U.S. PATENT DOCUMENTS

2012/0303835 A1* 11/2012 Kempf .................. H04W 24/02
709/235

OTHER PUBLICATIONS

"Corporate Telecommunication Networks—Mobility for Enterprise Communications", ecma International, Oct. 2010, 32 pages.

"3rd Generation Partnership Project; Technical Specification Group Services and System Aspects; Local IP Access and Selected IP Traffic Offload (LIPA-SIPTO)(Release 10)", 3GPP TS 23.829 v10.0.0, Mar. 2011, 43 pages.

"3rd Generation Partnership Project; Technical Specification Group Services and System Aspects; Network architecture (Release 9)", 3GPP TS 23.002 v9.3.0, Jun. 2010, 94 pages.

* cited by examiner

MOBILE CELLULAR NETWORK BASED ON LAYERED CLOUD COMPUTING

CROSS-REFERENCE TO RELATED APPLICATIONS

This application is a continuation of International Application No. PCT/CN2011/077926, filed on Aug. 2, 2011, which is hereby incorporated by reference in its entirety.

TECHNICAL FIELD

The present invention generally relates to a mobile cellular network, and in particular, to a mobile cellular network system structure based on layered cloud computing.

BACKGROUND

Cloud computing is a popular technology of future mobile communications system, which integrates signal processing units of base stations, and controls each cellular antenna to perform transmission of a downlink signal and receiving of an uplink signal through a radio frequency zoom-out method. By performing integrated signal processing, the cloud computing is capable of performing cross-cell joint signal processing to improve the utilization rate of frequency spectrum, thereby flexibly allocating computing resources. The implementation of the cloud computing will impose huge impact on the network structure of the mobile communications system.

The system structure of the conventional mobile cellular network is illustrated in detail in a specification 3GPP TS 23.002 named "Technical Specification Group Services and System Aspects; Network architecture" and proposed by the Third Generation Partnership Project (3GPP). The system structure of the conventional mobile cellular network has the following features:

(1) Uplink/downlink network data is converged/diverged stepwise. By taking the uplink network data as an example, data generated by each base station of an access network is first converged to a radio network controller (RNC) of the access network, the data of each RNC is converged to a serving GPRS support node (SGSN) of a core network, and the data of each SGSN is converged to a gateway GPRS support node (GGSN), so as to enter an external packet data network (for example, Internet).

(2) Each user has a uniquely determined access network management node in the access network. For example, in an E-UTRAN, the uplink/downlink data of each user is managed by a uniquely determined eNodeB. The core network definitely learns the access network management node of each user, and therefore, it only needs to transmit the network data to the unique access network management node of the user.

(3) All air interface data processing is completed on the access network. The core network is mainly responsible for data convergence and mobility management, and is not involved in the air interface data processing.

When the network data traffic of the access network node is small and the system has a few demands on cross-cell joint data processing, the foregoing system structure is applicable. However, for a mobile cellular system based on cloud computing, the foregoing system structure is not applicable.

According to the classification of the conventional system structure of the mobile cellular network, each cloud computing node should be a node in the access network. Due to the feature of integrated computing, the cloud computing nodes will generate or converge a large amount of network data, and as a result, it is no longer suitable to perform uplink convergence or downlink divergence for the data of the cloud computing nodes in the core network. Therefore, the core network structure of the conventional mobile communications system for stepwise convergence/divergence is no longer applicable due to low efficiency.

Consequently, a new system structure of mobile cellular network capable of adapting the cloud computing technology is required.

SUMMARY

Directed to the foregoing problems, the present invention provides a new system structure of mobile cellular network based on layered cloud computing.

According to an aspect of the present invention, a cloud computing system is provided, which includes at least one cloud radio gateway (CRG) node, at least one macro cloud (MC) node and at least one distributive unit (DU) node. The at least one CRG node is located at the top layer in a core network of a mobile cellular network, the at least one MC node and the at least one DU node are located in an access network of the mobile cellular network, the at least one CRG node, the at least one MC node and the at least one DU node are all capable of performing cloud computing, the at least one DU node is located in coverage of the at least one MC node, and the at least one MC node is located in coverage of the at least one CRG node, where, the at least one CRG node is configured to: receive network data from a public data network (PDN)/public switched telephone network (PSTN); allocate the received network data to one node of the at least one CRG node, the at least one MC node, the at least one DU node, and another CRG node in the core network, or allocate the received network data to multiple nodes of the at least one CRG node, the at least one MC node, the at least one DU node and the other CRG node; and if receiving the allocated network data, perform signal processing of an air interface protocol stack on the allocated network data, to generate a downlink baseband signal, and send the generated downlink baseband signal to the at least one MC node or to the at least one DU node through the at least one MC node;

the at least one MC node is configured to: if receiving the allocated network data, perform signal processing of an air interface protocol stack on the allocated network data to generate a downlink baseband signal, and send the generated downlink baseband signal to a user or to the at least one DU node; and if receiving a downlink baseband signal from the at least one CRG node, the other CRG node, the at least one DU node, or another MC node in the access network, send the received downlink baseband signal to the user or to the at least one DU node; and the at least one DU node is configured to: if receiving the allocated network data, perform signal processing of an air interface protocol stack on the allocated network data to generate a downlink baseband signal, and send the generated downlink baseband signal to the user; and if receiving a downlink baseband signal from the at least one MC node or from the at least one CRG node, the other CRG node or the other MC node through the at least one MC node, send the received downlink baseband signal to the user.

According to another aspect of the present invention, a downlink divergence method in a cloud computing system is provided, and the cloud computing system includes at least one cloud radio gateway (CRG) node, at least one macro cloud (MC) node and at least one distributive unit (DU)

node, where the at least one CRG node is located at the top layer in a core network of a mobile cellular network, the at least one MC node and the at least one DU node are located in an access network of the mobile cellular network, the at least one CRG node, the at least one MC node and the at least one DU node are all capable of performing cloud computing, the at least one DU node is located in coverage of the at least one MC node, the at least one MC node is located in coverage of the at least one CRG node, and the method includes:

receiving, by the at least one CRG node, network data from a public data network (PDN)/public switched telephone network (PSTN);

allocating, by the at least one CRG node, the received network data to one node of the at least one CRG node, the at least one MC node, the at least one DU node, and another CRG node in the core network, or allocating the received network data to multiple nodes of the at least one CRG node, the at least one MC node, the at least one DU node and the other CRG node;

performing, by the one node or multiple nodes receiving the allocated network data, signal processing of an air interface protocol stack on the allocated network data, to generate a downlink baseband signal; and sending, by the at least one MC node or the at least one DU node, the generated downlink baseband signal to a user.

According to another aspect of the present invention, an uplink convergence method in a cloud computing system is provided, and the cloud computing system includes at least one cloud radio gateway (CRG) node, at least one macro cloud (MC) node and at least one distributive unit (DU) node, where the at least one CRG node is located at the top layer in a core network of a mobile cellular network, the at least one MC node and the at least one DU node are located in an access network of the mobile cellular network, the at least one CRG node, the at least one MC node, and the at least one DU node are all capable of performing cloud computing, the at least one DU node is located in coverage of the at least one MC node, the at least one MC node is located in coverage of the at least one CRG node, and the method includes:

receiving, by the at least one MC node or the at least one DU node, an uplink baseband signal from a user;

forwarding, by the at least one MC node or by the at least one DU node through the at least one MC node, the received uplink baseband signal to the at least one CRG node;

performing, by the at least one CRG node, signal processing of an air interface protocol stack on the received uplink baseband signal, so as to generate network data; and sending, by the at least one CRG node, the generated network data to a public data network (PDN)/public switched telephone network (PSTN).

According to another aspect of the present invention, a cloud radio gateway (CRG) node is provided, which is located at the top layer in a core network of a mobile cellular network, where the mobile cellular network further includes another CRG node located at the top layer in the core network, and at least one macro cloud (MC) node and at least one distributive unit (DU) node located in an access network, the at least one MC node and the at least one DU node are both capable of performing cloud computing, the at least one DU node is located in coverage of the at least one MC node, the at least one MC node is located in coverage of the CRG node, and the CRG node includes:

a public data network (PDN)/public switched telephone network (PSTN) gateway, configured to receive network data from a PDN/PSTN, and/or send network data to the PDN/PSTN;

a management module, configured to allocate the network data received by the PDN/PSTN gateway to one node of the CRG node, the at least one MC node, the at least one DU node, and the other CRG node in the core network or allocate the received network data to multiple nodes of the CRG node, the at least one MC node, the at least one DU node and the other CRG node, and/or forward the network data to the PDN/PSTN gateway;

an air interface cloud processing module, configured to receive the network data allocated by the management module, perform signal processing of an air interface protocol stack on the received network data to generate a downlink baseband signal, and/or configured to perform signal processing of an air interface protocol stack on an uplink baseband signal to generate network data, and send the generated network data to the management module; and an air interface cloud processing control module, configured to receive the downlink baseband signal from the air interface cloud processing module and send the downlink baseband signal to the at least one MC node or to the at least one DU node through the at least one MC node, and/or receive the uplink baseband signal from the at least one MC node or from the at least one DU node through the at least one MC node and send the uplink baseband signal to the air interface cloud processing module.

According to another aspect of the present invention, a downlink divergence method in a cloud radio gateway (CRG) node is provided, where the CRG node is located at the top layer in a core network of a mobile cellular network, the mobile cellular network further includes another CRG node located at the top layer in the core network, and at least one macro cloud (MC) node and at least one distributive unit (DU) node located in an access network, the at least one MC node and the at least one DU node are both capable of performing cloud computing, the at least one DU node is located in coverage of the at least one MC node, the at least one MC node is located in coverage of the CRG node, and the method includes:

receiving network data from a public data network (PDN)/public switched telephone network (PSTN);

allocating the received network data to one node of the CRG node, the at least one MC node, the at least one DU node, and the other CRG node in the core network, or allocating the received network data to multiple nodes of the CRG node, the at least one MC node, the at least one DU node and the other CRG node;

if receiving the allocated network data, performing signal processing of an air interface protocol stack on the received network data, to generate a downlink baseband signal; and sending the generated downlink baseband signal to the at least one MC node or to the at least one DU node through the at least one MC node.

According to another aspect of the present invention, an uplink convergence method in a cloud radio gateway (CRG) node is provided, where the CRG node is located at the top layer in a core network of a mobile cellular network, the mobile cellular network further includes another CRG node located at the top layer in the core network, and at least one macro cloud (MC) node and at least one distributive unit (DU) node located in an access network, the at least one MC node and the at least one DU node are both capable of performing cloud computing, the at least one DU node is located in coverage of the at least one MC node, the at least one MC node is located in coverage of the CRG node, and the method includes:

receiving an uplink baseband signal from the at least one MC node or from the at least one DU node through the at least one MC node;

performing signal processing of an air interface protocol stack on the received uplink baseband signal, to generate network data; and sending the generated network data to a public data network (PDN)/public switched telephone network (PSTN).

Embodiments of the present invention propose a new system structure of the mobile cellular network directed to layered self-adaptive cloud computing. The system structure can be completely compatible with the conventional network nodes and standards, and is capable of reusing a large number of conventional functional modules, so rapid development can be performed, and a large number of demands on throughput of the future mobile cellular network can be met with low deployment cost.

DETAILED DESCRIPTION

According to a system structure of mobile cellular network proposed in the present invention, a cloud computing node is capable of performing layered self-adaptation. A cloud computing node at a bottom layer may be responsible for joint signal processing of cells in a relatively small range, and a cloud computing node at a top layer may be responsible for joint signal processing of cells in a relatively large range. Joint signal processing may be performed among cloud computing nodes of different layers according to a requirement, and self-adaptive resource allocation may also be performed among the cloud computing nodes of different layers.

Due to the flexibility of layered cloud computing, air interface data processing of a user may be completed in different cloud computing nodes. Therefore, it is difficult for the user to have a relatively fixed access network management node at an access network side. For example, in a downlink direction, how a core network performs routing on network data of a user may be related to the air interface signal processing algorithm of a cloud computing node. Therefore, the conventional boundary of a core network and an access network is no longer available.

As a result, the present invention provides a new system structure of a mobile cellular system including a new core network and access network. The system structure is compatible with all conventional mobile air interface protocols including GSM, GPRS, UMTS and LTE. The system structure supports a cloud computing function, is capable of providing joint signal processing and joint scheduling of the same air interface standard or even cross air interface standards, and may flexibly allocate computing resources among nodes according to the requirement of signal processing. The system structure mixes a backbone node of cloud computing with a routing node of the core network and a PDN gateway, and compresses the structure of the core network, so that the core network has the cloud computing function and is capable of flexibly performing transmission of user data according to the algorithm of the cloud computing. Moreover, the backbone node of the cloud computing also obtains a gateway interface for accessing an external packet data network, and therefore, larger network data throughput can be provided for the user with lower deployment cost.

Figure 1:
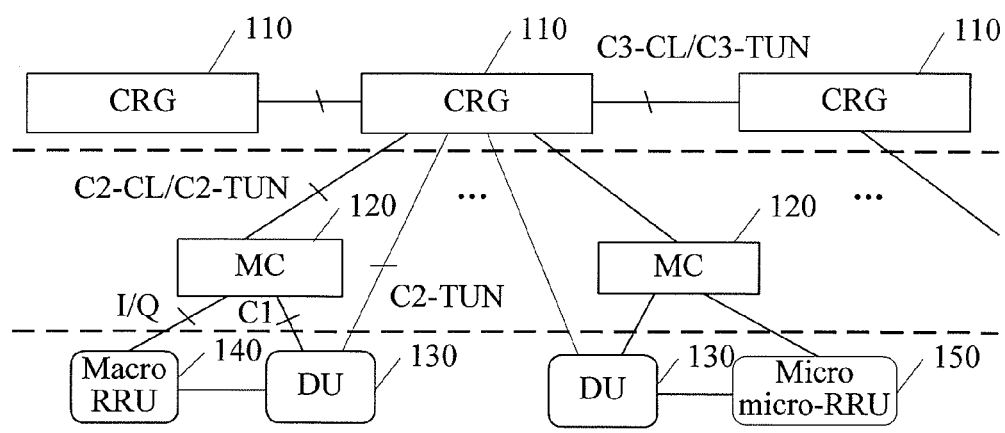
FIG. 1 is a schematic diagram of a system structure of a mobile cellular network according to an embodiment of the present invention.

FIG. 1 is a schematic diagram of a system structure of a mobile cellular network according to an embodiment of the present invention. Different from the structure of the conventional mobile cellular network, the system structure may include: a cloud radio gateway (CRG: Cloud Radio Gateway) node (for example, a CRG 110), a macro cloud (MC: Macro Cloud) node (for example, an MC 120), a distributive unit (DU: Distributive Unit) node (for example, a DU 130), a radio remote unit (RRU: Radio Remote Unit) node (for example, a macro RRU 140 and a micro micro-RRU 150) and conventional core network and access network nodes (not shown).

According to an embodiment of the present invention, a new core network may include several CRGs 110 and conventional core network nodes. Each CRG 110 may manage several MCs 120, and may also manage conventional access network nodes (such as, RNC, eNodeB, and BSS). Any two CRGs 110 are connected through a logical interface C3 (including C3-CL and C3-TUN). A CRG 110 may also be connected with a conventional core network node (such as HSS and PCRF) and access network node (such as RNC and eNodeB) through conventional standard interfaces.

According to an embodiment of the present invention, a new access network may include several MCs 120, DUs 130, RRUs 140 and 150, and conventional access network nodes. Each MC 120 may manage several DUs 130, and RRUs 140 and 150. An MC 120 and the CRG 110 managing the MC 120 are connected through a logical interface C2 (including C2-CL and C2-TUN), the MC 120 and the RRU 140, 150 that are managed by the MC 120 are connected through a conventional I/Q data interface (for example, CPRI), and the MC 120 and the DU 130 managed by the MC 120 are connected through a logical interface C1. The DU 130 may also communicate with the CRG 110 through the logical interface C2-TUN. Moreover, the DU 130 may also be connected to, for example, the micro micro-RRU 150, and at this time, the specific implementation of DU+RRU may include the BSS, RNS and eNodeB.

The nodes involved in the system structure of the present invention are illustrated in detail in the following.

The CRG 110 is a cloud computing node located at the top layer of the core network, and is a node for data routing and mobility management at the top layer. The CRG 110 may provide the following functions: providing the joint signal processing of an air interface protocol stack function for the MC 120 and DU 130 managed by the CRG 110; when a resource is idle, providing the signal processing of the air interface protocol stack function for another cloud computing node; running a gateway for accessing the PDN and the PSTN, and having egress bandwidth shared by different CRGs 110; providing a data channel from an external interface of an air interface protocol stack to the PDN/PSTN gateway and mobility management for a managed access network node; and having a function of communicating with a conventional core network node through a conventional logical interface, for example, querying the core network node, such as the HSS and the PCRF.

The MC 120 is an intermediate node of the cloud computing, and is also an access network node. The MC 120 may provide the following functions: providing the joint signal processing of an air interface protocol stack function for a managed cell set; when a resource is idle, providing the signal processing of the air interface protocol stack function for another cloud computing node; providing a part of mobility management functions for a user; providing an interface for communicating with the core network; providing an access interface and a part of mobility management functions for a radio system of non-3GPP standard; and serving as a node of a local IP network (for example, a local intranet or premises network) to provide a function of accessing the local IP network, and at the same time, providing a channel for accessing an external network, to implement the function of local offloading of IP data.

The DU 130 is an end node of the cloud computing, and is also an access network node. The DU 130 may provide the following functions: providing the joint signal processing of an air interface protocol stack function for a managed cell set; when a resource is idle, providing the signal processing of the air interface protocol stack function for another cloud computing node; providing an interface for communicating with the core network; and providing a part of mobility management functions for the user.

The RRU 140, 150 each may be an RRU of any radio standard. Each RRU node may form multiple cells through multiple antennas, and may support software radio, so as to change the radio standard or frequency band of the RRU.

The system structure of the present invention further includes interfaces C1, C2, and C3 used for providing interconnection among the nodes.

The C3 interface includes two types of interface, that is, C3-CL and C3-TUN. The C3-CL interface may be used for mutual data transmission among different CRGs during cloud computing. For example, a CRG 110 (or an MC 120 thereof) may transmit, through the C3-CL interface, a part of signal processing tasks of an air interface protocol stack to another CRG 110 (or an MC 120 thereof) for processing, and the other CRG 110 (or the MC 120 thereof) feeds back a processing result to the CRG 110 (or the MC 120 thereof) through the C3-CL interface. The C3-TUN interface is used to transmit user plane and control plane data in the core network. For example, different CRGs 110 may negotiate egress bandwidth of a PDN gateway through the C3-TUN interface, a CRG 110 may send an IP data packet to another CRG 110 through the C3-TUN interface, and the other CRG 110 sends the data packet to an external PDN. Moreover, for example, when a user performs cross-CRG handover, communication may be performed through the C3-TUN interface.

The C2 interface includes two types of interface, that is, C2-CL and C2-TUN. The C2-CL interface may be used for data transmission during cloud computing. For example, the MC 120 may perform the joint signal processing of an air interface protocol stack with the CRG 110 through the C2-CL interface. Moreover, for example, another node of the cloud computing may send a signal processing task of an air interface protocol stack to the MC 120 through the C2-CL interface, the MC 120 may feedback a computing result through the C2-CL interface, and vice versa. The C2-TUN interface may be used for mutual transmission of user plane and control plane data between the MC 120 or DU 130 and the CRG 110.

The C1 interface may be used for data transmission during cloud computing. For example, the DU 130 may perform the joint signal processing of an air interface protocol stack with the MC 120 through the C1 interface. Moreover, for example, another node of the cloud computing may send a signal processing task of an air interface protocol stack to the DU 130 through the C1 interface, the DU 130 may feedback a computing result through the C1 interface, and vice versa.

As described above, in a mobile cellular network according to the present invention, a layered structure is implemented by using three types of nodes, that is, the CRG 110, the MC 120, and the DU 130. In specific implementation of the layered structure, functions of the three types of nodes may be divided in terms of deployment position, air interface processing, mobility management and data stream, and so on.

From the deployment position: the DU 130 is approximately equivalent to a micro micro-base station or a milli-micro micro-base station, and has coverage generally smaller than 50 meters; several DUs 130 are associated to one MC 120 (with an RRU), the MC is approximately equivalent to a macro base station having coverage of about 200-300 meters, and multiple DUs 130 (associated DUs) may exist in the coverage of one MC 120, thereby constructing a two-layer network structure (referred to as a Heterogeneous Network Het-Net); and several MCs 120 are associated to one CRG 110, the CRG 110 does not have an RRU, and is not responsible for transmitting and receiving a radio signal.

From the aspect of air interface processing, the DU 130, MC 120, and CRG 110 all have the capacity of processing air interface data. The air interface processing relates to a local computing service and a remote assistance computing service. The local computing service refers to air interface protocol stack processing performed by the DU 130, MC 120, and CRG 110 for a user in the coverage thereof. In term of the local computing service, the DU 130 is mainly responsible for a user that does not need joint processing in the coverage thereof, the MC 120 is mainly responsible for a user that does not need to perform joint processing with another MC 120 in the coverage thereof, and the joint processing across the coverage of the MC 120 is completed at the CRG 110. During the processing of the local computing service, the cloud computing is mainly embodied as: performing the joint signal processing (including encoding/decoding, modulation/demodulation, MIMO joint pre-coding, joint signal detection, and the like) at PHY layers of different nodes; performing joint scheduling, and performing joint computing between MAC layers and RRC layers of different nodes, so as to determine uplink/downlink radio resource scheduling (such as, uplink/downlink resource allocation and multi-user MIMO matching) together; and performing data and state synchronization among peer protocol layers of air interface protocol stacks of different nodes. The remote assistance computing service refers to that, when the processing capacity of a PHY layer of a node is insufficient, the node packets the computing task of signal processing (including encoding/decoding, modulation/demodulation, MIMO joint pre-coding, joint signal detection, and the like) into a computing task packet, sends the packet to a PHY layer of another node, and then the PHY layer of the other node performs computing and feeds back a result. Therefore, the remote assistance computing mainly relates to computing resource sharing among PHY layers. In term of the remote assistance computing service, the DU 130, MC 120, and CRG 110 may all provide the computing capacity of air interface processing for other DU/MC/CRG when being idle. According to an embodiment, the priority of the local computing service is higher than that of the remote assistance computing service.

From the aspect of mobility management and data stream: the DU 130 may have the mobility management capacity of air interfaces of the same standard in the coverage thereof (for example, cell handover of the same standard inside the DU); the MC 120 may have the mobility management function of air interfaces of the same standard in the coverage thereof (for example, cell handover of the same standard inside the MC), and the MC 120 may provide a network egress at a radio access network (RAN) side (for example, communicate with an external network at the RAN side through LIPA and SIPTO protocols); and the CRG 110 may have the most complete mobility management capacity, including the cell handover inside the CRG and cross-CRG cell handover, and the CRG 110 may provide a network egress of a core network.

Figure 2:
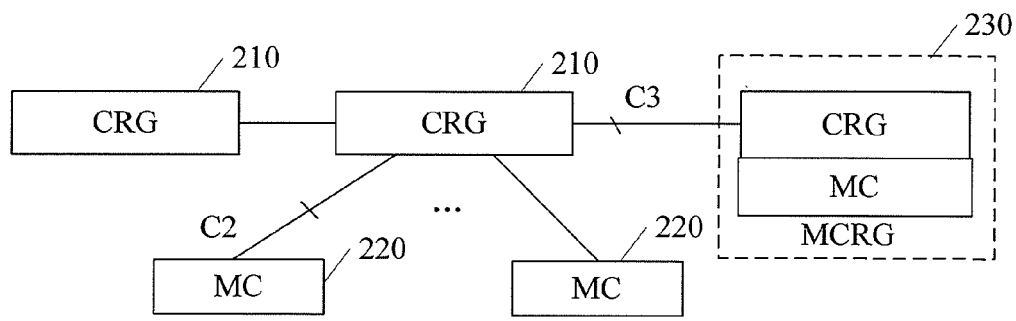
FIG. 2 is a schematic diagram of a system structure of a mobile cellular network according to another embodiment of the present invention.

FIG. 2 is a schematic diagram of a system structure of a mobile cellular network according to another embodiment of the present invention.

As shown in FIG. 2, optionally, an MC node and a CRG node may be placed together in an actual application, so as to construct an MCRG node 230. The function of the MCRG 230 may be a superposition of functions of a CRG 210 and an MC 220. The MCRG 230 may be applied in some areas having high data throughput, and by deploying the MCRG 230 in the areas, network data can directly enter a PDN/PSTN through a local gateway, thereby saving the cost of laying a large capacity C2 interface.

Figure 3:
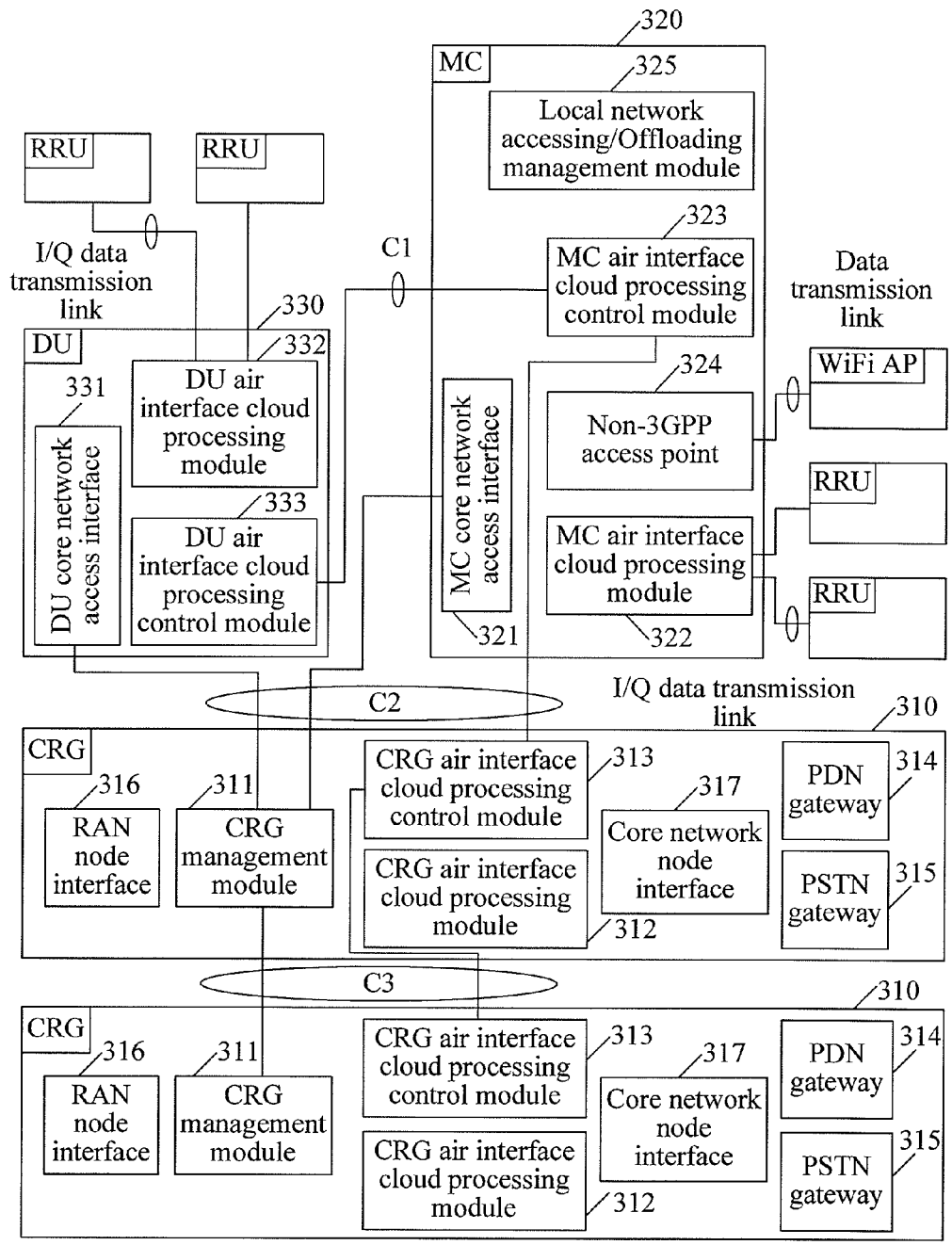
FIG. 3 is a schematic diagram of a cloud computing node according to an embodiment of the present invention.

FIG. 3 is a schematic diagram of a structure of a cloud computing node according to an embodiment of the present invention. Specifically, FIG. 3 shows a block diagram of modules of a CRG 310, an MC 320, and a DU 330.

As shown in the drawing, the CRG 310 may include: a CRG management module 311, a CRG air interface cloud processing module 312, a CRG air interface cloud processing control module 313, a PDN gateway 314 and a PSTN gateway 315.

The CRG management module 311 may be configured to provide a data channel from an external interface of an air interface protocol stack to the PDN gateway 314/PSTN gateway 315 and mobility management. For example, the CRG management module 311 may allocate downlink network data, which is received from the PDN gateway 314/PSTN gateway 315, to the corresponding MC 320, DU 330 or another CRG, or eNodeB, RNC, or BSC, and may transmit uplink network data received from the MC 320, DU 330 or another CRG, or eNodeB, RNC and BSC to the PDN gateway 314/PSTN gateway 315. Moreover, the CRG management module 311 is further configured to perform mobility management for a user.

The CRG air interface cloud processing module 312 may have the capacity of signal processing of an air interface protocol stack, and may provide a joint signal processing capacity for the MC 320 and DU 330 that are managed by the CRG 310 and for another CRG, for example, the joint signal processing at a PHY layer and joint user scheduling at a MAC layer. Moreover, the CRG air interface cloud processing module 312 is further configured to, when being idle, assist in providing the capacity of signal processing of an air interface protocol stack for another cloud computing node.

The CRG air interface cloud processing control module 313 may be configured to control transmission of intermediate data and result data (for example, a baseband signal) of cloud processing in a network. For example, the CRG air interface cloud processing control module 313 may exchange data related to the cloud processing with corresponding air interface cloud processing control modules of the DU 330 and MC 320 and with an air interface cloud processing control module of the other CRG.

The PDN gateway 314 and the PSTN gateway 315 may serve as gateways between the mobile cellular network and the PDN/PSTN, used for transmitting, for example, network data. According to the requirement of specific application, the PDN gateway 314 and the PSTN gateway 315 may be implemented as separated functional modules, and may also be integrated together.

In a preferred embodiment, the CRG 310 may also include an RAN node interface 316. The RAN node interface 316 may use a logical interface defined in the conventional mobile cellular standard to connect to a node in the conventional RAN, so as to ensure that the present invention can be compatible with the conventional RAN node. For example, it may be connected with an eNodeB through an S1 interface, connected to an RNC through an Iu interface, connected to a BSC through a Gb/A interface, and the like.

In a preferred embodiment, the CRG 310 may also include a core network node interface 317. The core network node interface 317 may use a logical interface defined in the conventional mobile cellular standard to connect to a node in the conventional core network. For example, it may be connected with an HSS through an S6a interface, connected with an EIR through an S6d interface, connected with a PCRF through an S9 interface, and the like.

Modules in the CRG 310 may communicate with one another through an internal interconnect bus.

As shown in the drawing, the MC 320 may include an MC core network access interface 321 and an MC air interface cloud processing module 322.

The MC core network access interface 321 may be configured to provide the MC 320 with an interface for accessing a core network. For example, the MC core network access interface 321 may be communicated with the CRG management module 311.

The MC air interface cloud processing module 322 may be configured to perform the joint signal processing of an air interface protocol stack with the CRG node 310 on an upper layer and the DU node 330 managed. Moreover, the MC air interface cloud processing module 322 may be further configured to, when being idle, assist in providing the capacity of signal processing of an air interface protocol stack for another cloud computing node.

In a preferred embodiment, the MC 320 may further include an MC air interface cloud processing control module 323. The MC air interface cloud processing control module 323 may be configured to control transmission of intermediate data and result data of cloud processing in the network.

In a preferred embodiment, the MC 320 may further include a non-3GPP access point 324. The non-3GPP access point 324 may be responsible for the access of a non-3GPP base station, and implement access control and authentication for an external access network. The non-3GPP access point 324 may further, under the management of the MC air interface cloud processing control module 323, perform interaction of data and control messages with the MC air interface cloud processing module 322, perform multi-standard joint transmission for a user equipment supporting multiple modes, and so on.

In a preferred embodiment, the MC 320 may also include a local network accessing/Offloading management module 325. The local network accessing/Offloading management module 325 may be configured to provide the MC 320 with the following two functions of accessing the external network: (1) when the MC 320 is a node of a certain local network (for example, a local intranet), the local network accessing/Offloading management module 325 may provide the MC 320 with the function of directly accessing the local network; (2) at the MC 320, IP data traffic designated by a specific user may directly enter the external network through the local network accessing/Offloading management module 325, that is, offloading.

Modules in the MC 320 may communicate with one another through an internal interconnect bus.

As shown in the drawing, the DU 330 may include a DU core network access interface 331 and a DU air interface cloud processing module 332. In a preferred embodiment, the DU 330 may further include a DU air interface cloud processing control module 333. The modules in the DU 330 have the similar functions to those of the corresponding modules in the MC 320, and details are not repeated herein. The modules in the DU 330 may communicate with one another through an internal interconnect bus. The DU 330 generally has two working manners: (1) using a C2-TUN interface between the DU core network access interface 331 and the CRG management module 311 to exchange air interface communication data with the CRG 310, and in this situation, from the aspect of the CRG 310, the DU 330 and the MC 320 have the same status; (2) using a C1 interface between the DU air interface cloud processing control module 332 and the MC air interface cloud processing control module 323 to exchange air interface communication data with the MC 320, and in this situation, from the aspect of the CRG 310, the DU 330 is subordinate to the MC 320.

In FIG. 3, the MC/DU core network access interface 321/331 and the CRG management module 311 perform communication through the C2-TUN interface, the MC air interface cloud processing control module 323 and the CRG air interface cloud processing control module 313 perform communication through the C2-CL interface, the CRG management modules 311 perform communication through the C3-TUN interface, and the CRG air interface cloud processing control modules 313 perform communication through the C3-CL interface.

Functional module mapping of node functions defined in the conventional mobile cellular standard in the system structure of the present invention are illustrated in the following through examples. During specific implantation, each functional module is not required to be implemented separately, and in fact, it is only required to provide the functions of the modules.

According to an embodiment of the present invention, each function (for example, the mobility management of a user) defined in the conventional mobile cellular standard may be implemented through the following manner: considering the air interface cloud processing module of the MC or DU and the corresponding RRU as the eNodeB/RNS/BSS; considering each functional module in the CRG as a node defined in the conventional mobile cellular standard (for example, considering an SGSN functional sub-module as an SGSN node); and making interface communication among the nodes defined in the conventional mobile cellular standard to be still valid in the system structure of the present invention and to be implemented through corresponding interfaces in the present invention, for example, some interface communication (such as S1) may be implemented through C1, C2 and C3 interfaces, some interface communication (such as Gc) still works in the conventional manner, and other interface communication (such as S5) may be implemented inside the CRG, MC or DU.

Figure 4:
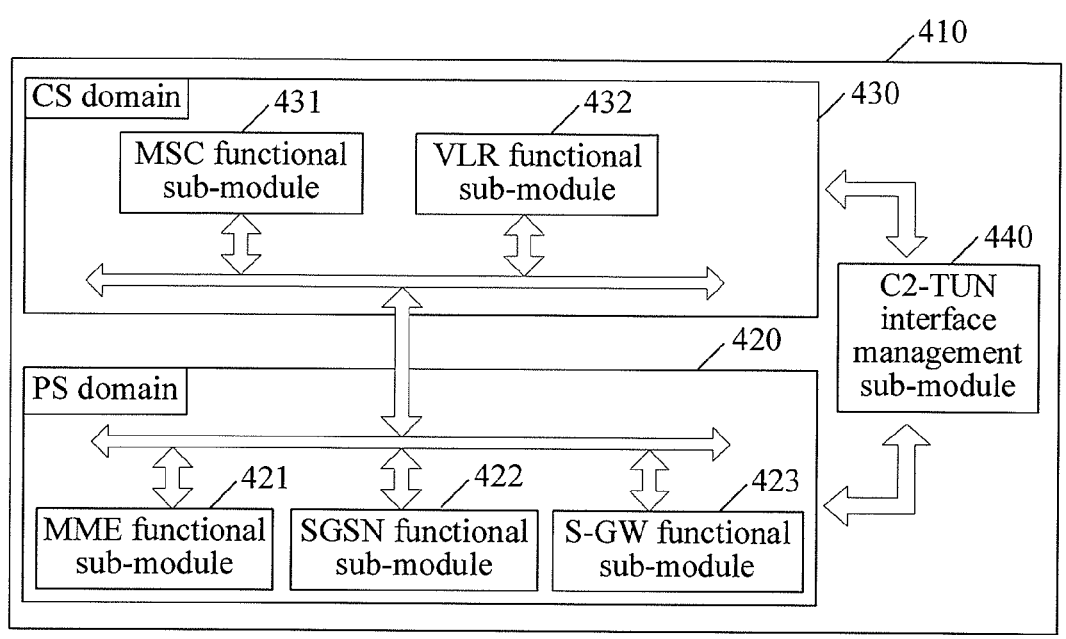
FIG. 4 is a schematic diagram of a CRG management module according to an embodiment of the present invention.

FIG. 4 is a schematic diagram of a CRG management module according to an embodiment of the present invention.

A packet switching (PS) domain sub-module 420 of the CRG management module 410 may include, for example, an MME functional sub-module 421, an SGSN functional sub-module 422 and an S-GW functional sub-module 423. The sub-modules 421-423 implement the functions of the MME, SGSN, and S-GW, respectively, and the communication among them is performed through an internal data channel in the CRG management module 410.

A circuit switching (CS) domain sub-module 430 of the CRG management module 410 may include, for example, an MSC functional sub-module 431 and a VLR functional sub-module 432. The sub-modules 431-432 implement the functions of the MSC and VLR, respectively, and the communication among them is performed through an internal data channel in the CRG management module 410.

The PS domain sub-module 420 and the CS domain sub-module 430 are connected through an internal data channel, and the PS/CS domain sub-module and a C2-TUN interface management sub-module 440 are connected through an internal data channel. The C2-TUN interface management sub-module 440 may manage the C2-TUN interface, and provide the connection for another sub-module to the MC/DU core network access interface.

According to another embodiment of the present invention, in addition to the sub-modules 421-423, 431-432, the CRG management module 410 may further include any other sub-module corresponding to the node defined in the conventional mobile cellular standard.

Figure 5:
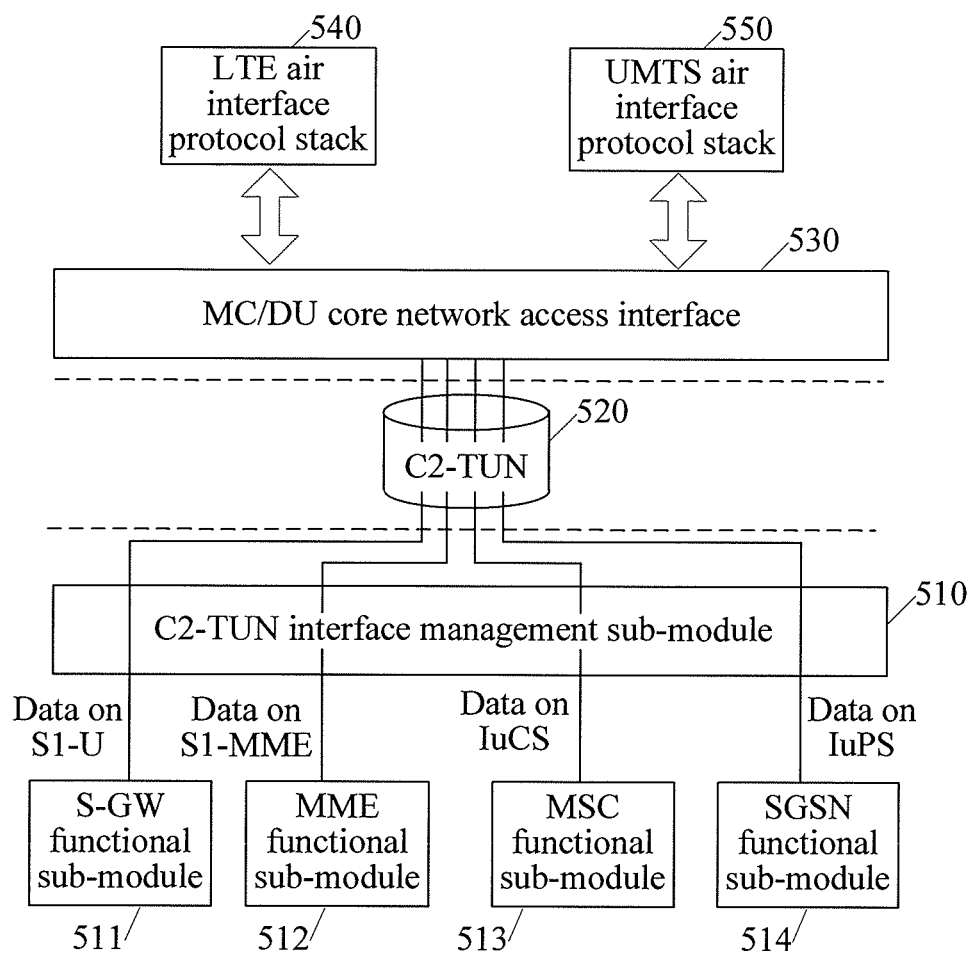
FIG. 5 is a schematic diagram of application of a C2-TUN interface according to an embodiment of the present invention.

FIG. 5 is a schematic diagram of application of a C2-TUN interface according to an embodiment of the present invention. As shown in FIG. 5, through a C2-TUN interface 520 managed by a C2-TUN interface management sub-module 510, each sub-module in the CRG management module 410 may be connected with an MC/DU core network access interface 530. In order to use the interfaces defined in the conventional standard as much as possible, the C2-TUN interface 520 may be served as a universal data channel, so that the interface communication defined in the conventional protocol may be executed in the C2-TUN interface 520, but the specific implementation of the C2-TUN interface 520 is not limited in the present invention.

As shown in FIG. 5, an S-GW functional sub-module 511 may transmit data of a conventional S1-U interface on the C2-TUN interface 520, an MME functional sub-module 512 may transmit data of a conventional S1-MME interface on the C2-TUN interface 520, an MSC functional sub-module 513 may transmit data of a conventional IuCS interface on the C2-TUN interface 520, and an SGSN functional sub-module 514 may transmit data of a conventional IuPS interface on the C2-TUN interface 520.

The C2-TUN interface 520 may distinguish communication of different sub-modules, encapsulate data into the message format of each conventional interface, and perform transmission according to a related protocol stack.

The MC/DU core network access interface 530 may be configured to: parse data received from the C2-TUN interface 520, and transfer the data to an LTE air interface protocol stack 540 or a UMTS air interface protocol stack 550; and transfer data received from the LTE air interface protocol stack 540 or the UMTS air interface protocol stack 550 to the CRG management module through the C2-TUN interface 520. Here, the transferring function of the MC/DU core network access interface 530 is similar to the function of transferring "air interface protocol stack-S1/Iu protocol" by the RNC/eNodeB, the only difference lies in that communication on the conventional S1/Iu is executed through the C2-TUN interface.

Figure 6:
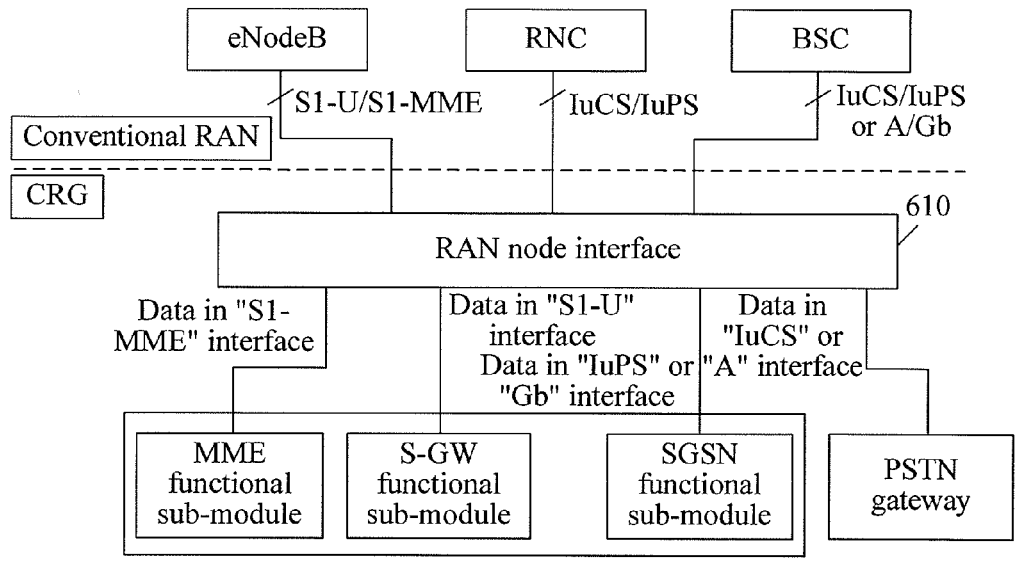
FIG. 6 is a schematic diagram of application of an RAN node interface according to an embodiment of the present invention.

FIG. 6 is a schematic diagram of application of an RAN node interface according to an embodiment of the present invention. The RAN node interface 610 may be configured to interconnect with an RAN node of the conventional mobile cellular network, so as to ensure the backward compatibility of the solution of the present invention. For example, as shown in FIG. 6, the RAN node interface 610 may be connected with the conventional RAN nodes, such as the eNodeB, RNC, and BSC, through conventional interfaces, such as the S1, Iu and Gb/A. The RAN node interface 610 may allocate signaling and data that are transmitted in the conventional interfaces to corresponding processing modules, such as the MME functional sub-module, the S-GW functional sub-module, and the SGSN functional sub-module, through the internal connection of the CRG.

Figure 7:
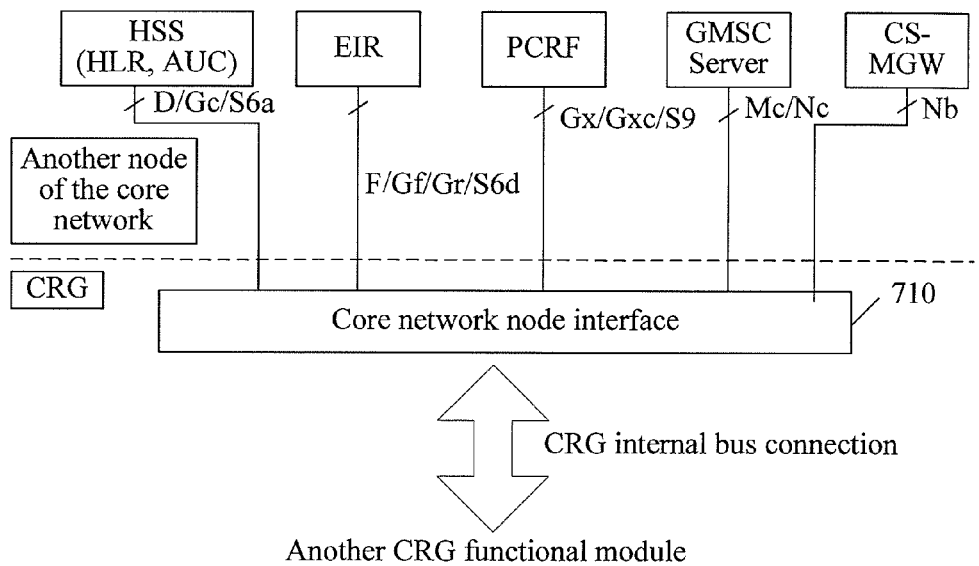
FIG. 7 is a schematic diagram of application of a core network node interface according to an embodiment of the present invention.

FIG. 7 is a schematic diagram of application of a core network node interface according to an embodiment of the present invention. A core network node interface 710 may be configured to provide connection with servers or functional nodes of the core network. For example, as shown in FIG. 7, the core network node interface 710 may be interconnected with the servers or functional nodes in the core network through interfaces defined in standards, so as to provide functional modules inside the CRG with a channel of accessing the another node of the core network.

According to an embodiment of the present invention, the PDN gateway in the CRG may implement the functions of GGSN and PDN-GW defined in the conventional standard, and the PSTN gateway in the CRG may implement the function of CS-MGW defined in the conventional standard.

According to the embodiment of the present invention, the local network accessing/Offloading management module in the MC may implement the RAN side function of the LIPA/SIPTO described in the conventional standard (for example, 3GPP TR23.829, "Technical Specification Group Services and System Aspects; Local IP Access and Selected IP Traffic Offload (LIPA-SIPTO)"), thereby providing the MC with the function of local network accessing or traffic offloading. For example, the exemplary implementation of the local network accessing/Offloading management module may include:

(1) The MC may be considered as an HeNodeB, and then implements the "Solution 1" described in the 3GPP TR23.829. At this time, the local network accessing/Offloading management module may implement the function of L-GW described in the 3GPP TR23.829, thereby having the function of the LIPA at the RAN side. At the same time, the local network accessing/Offloading management module may also cooperate with the L-PGW or L-GGSN deployed in the local network, to implement the SIPTO function.

(2) The MC may be considered as an HeNodeB, and then implements the "Solution 2" described in the 3GPP TR23.829. At this time, the local network accessing/Offloading management module may implement the function of OPM described in the 3GPP TR23.829, thereby having the function of the LIPA or SIPTO at the RAN side.

(3) The MC may be considered as an RNC, HeNodeB, or HNB-GW, and then implements the "Solution 3" described in the 3GPP TR23.829. A corresponding RAN side function is implemented in the local network accessing/Offloading management module.

(4) The MC may implement the "Solution 4" described in the 3GPP TR23.829. At this time, the local network accessing/Offloading management module may implement the function of TOF described in the 3GPP TR23.829, thereby having the function of the SIPTO at the RAN side.

(5) The MC may implement the "Solution 5" described in the 3GPP TR23.829. At this time, the local network accessing/Offloading management module may implement the function of L-PGW/L-GGSN described in the 3GPP TR23.829, thereby having the function of the SIPTO at the RAN side.

(6) The MC may implement the "Solution 6" described in the 3GPP TR23.829. At this time, the local network accessing/Offloading management module may implement the function of L-GW described in the 3GPP TR23.829, thereby having the function of the LIPA or SIPTO at the RAN side.

In order to support the LIPA or SIPTO, the functions of the two protocols at the core network side need to be implemented inside the CRG. The functions may be implemented in the sub-modules, such as the MME functional sub-module and the SGSN functional sub-module. At the same time, in the LIPA and SIPTO, the communication between the RAN and the core network may be executed through the C2 interface.

Figure 8:
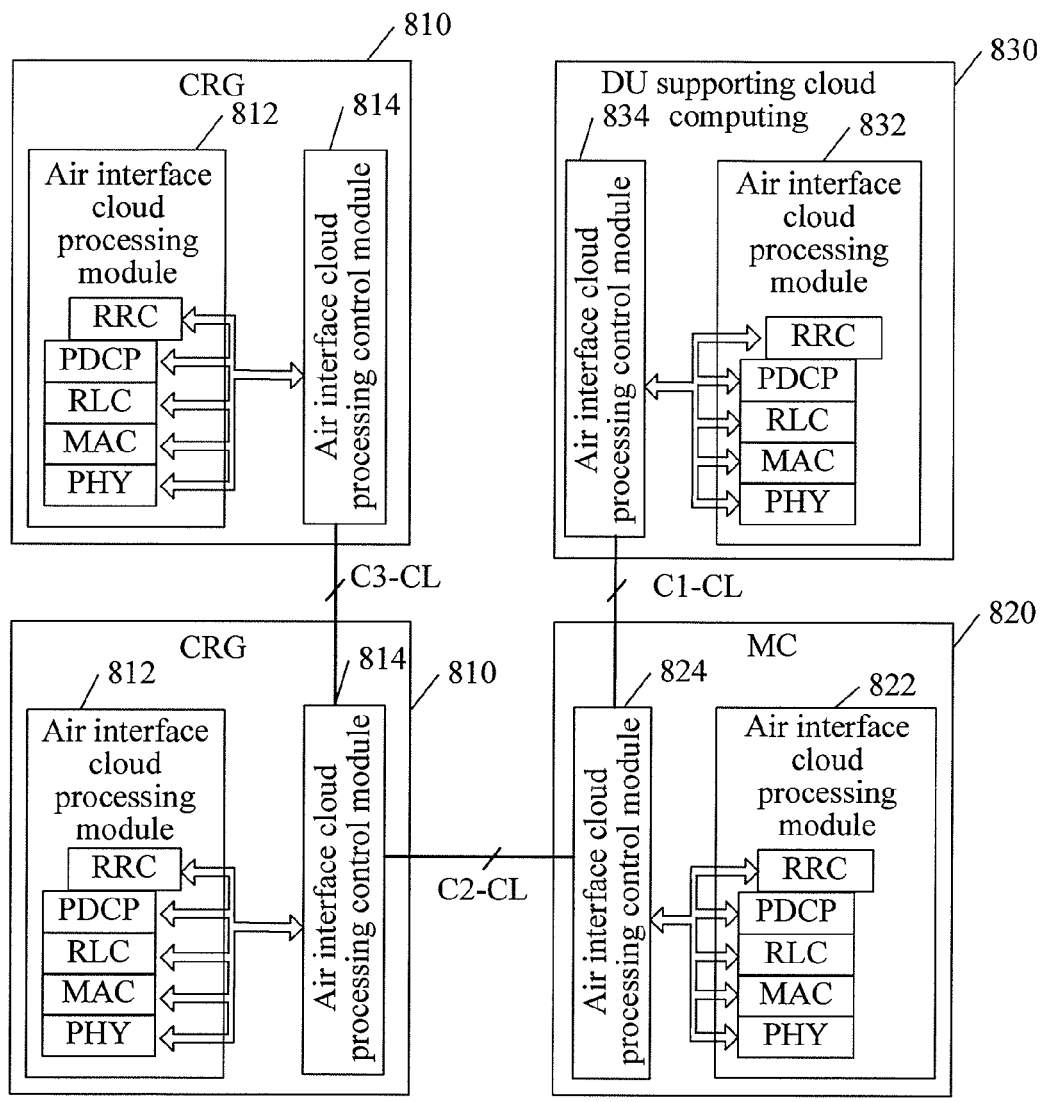
FIG. 8 is a simplified schematic diagram of performing air interface cloud processing among cloud computing nodes according to an embodiment of the present invention.

FIG. 8 is a simplified schematic diagram of performing air interface cloud processing among cloud computing nodes according to an embodiment of the present invention. As shown in the drawing, a CRG 810 may include a CRG air interface cloud processing module 812 and a CRG air interface cloud processing control module 814, an MC 820 may include an MC air interface cloud processing module 822 and an MC air interface cloud processing control module 824, and a DU 830 may include a DU air interface cloud processing module 832 and a DU air interface cloud processing control module 834.

The CRG air interface cloud processing module 812, the MC air interface cloud processing module 822 and the DU air interface cloud processing module 832 are capable of processing the protocol stack (for example, from a PHY layer to an RRC layer) of each air interface standard (such as, UMTS, LTE, GPRS, and GSM) of the conventional mobile cellular system. For example, the air interface protocol stack processing may include: baseband signal processing of the PHY layer, such as scrambling/descrambling, encoding/decoding, modulation/demodulation, multiplexing/demultiplexing; processing on the MAC layer, such as HARQ and resource scheduling; processing on the RLC layer, such as ARQ and data packet segmenting; processing on the PDCP layer, such as head compression and security control; and processing on the RRC layer, such as user state management and resource scheduling. The protocol stack may also be classified into processing protocols related to the user plane and the control plane.

The CRG air interface cloud processing control module 814, the MC air interface cloud processing control module 824 and the DU air interface cloud processing control module 834 may be configured to: request a cloud processing control module of another node to perform the joint signal processing of an air interface protocol stack; request the cloud processing control module of another node to assist the signal processing of the air interface protocol stack; and respond to the request of another node, and so on.

Moreover, the air interface cloud processing control modules 814, 824, 834 may further be configured to provide channels of mutual communication for the air interface cloud processing modules of different nodes. For example, an air interface cloud processing control module may support a "transparent transmission" mode, that is, an air interface cloud processing module of a node may directly perform transmission to an air interface cloud processing module of another node through the air interface cloud processing control module of an intermediate node to implement joint processing, without the need of any processing at the intermediate node. For example, the DU air interface cloud processing module 832 may perform the joint processing with the CRG air interface cloud processing module 812 through the MC air interface cloud processing control module 824. The channel may support the communication from one protocol layer entity of a cloud computing node to the corresponding protocol layer entity of another cloud computing node, for example, support the communication from one physical layer entity of a DU 830 to one physical layer entity of a CRG 810, so as to implement the joint signal processing of the two physical layers. Moreover, according to the present invention, the joint signal processing may, for example, include the joint user scheduling of the MAC layer and the multi-user joint signal generation and detection of the PHY layer.

Moreover, the air interface cloud processing control modules 814, 824, 834 may also be configured to schedule computing resources, and balance the computing load among cloud computing nodes through the cloud processing control modules of the cloud computing nodes.

Through the control of the air interface cloud processing control modules 814, 824, and 834, the protocol stack of the air interface cloud processing module of each cloud computing node is capable of performing the joint processing of the same layer of a protocol with the protocol stack of the air interface cloud processing module of the other cloud computing node, and at the same time, a computing resource may also be shared among different cloud computing nodes.

Moreover, as shown in FIG. 8, the communication among the air interface cloud processing control modules 814, 824, 834 may be performed through C3-CL, C2-CL and C1-CL interfaces, respectively.

Figure 9:
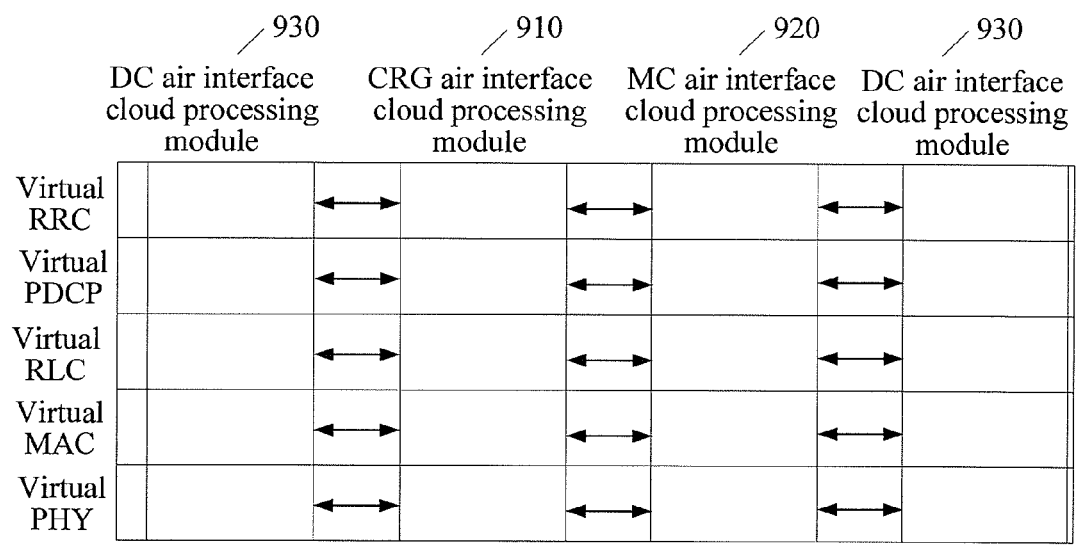
FIG. 9 is a layered schematic diagram of a protocol stack when performing air interface joint processing according to an embodiment of the present invention.

FIG. 9 is a layered schematic diagram of a protocol stack in air interface joint processing according to an embodiment of the present invention.

According to the embodiment of the present invention, a cloud processing plane is capable of providing the mutual communication of peer protocol layers for air interface cloud processing modules 910, 920, 930 of cloud computing nodes, so that an air interface peer layer of each cloud computing node runs as in a virtual node. Therefore, it can be considered that all processing performed on the air interface protocol stack of one node is implemented in a virtual node. FIG. 9 shows the air interface joint processing in the LTE or UNITS, where for the UMTS, the DU may only have the PHY layer and a part of the MAC layer.

A downlink example of the layered air interface cloud processing according to an embodiment of the present invention is illustrated in the following:

RRC, PDCP, RLC layers: the DU has all states and downlink data of RRC, PDCP, RLC layers of all users in coverage thereof; the MC has all states and downlink data of RRC, PDCP, RLC layers of all users in coverage thereof (covering directly or covering indirectly through the DU); and the CRG has all states and downlink data of RRC, PDCP, RLC layers of users in coverage thereof (covering indirectly through the MC and the DU). The RRC, PDCP, RLC layers of the DU, MC and CRG interact state information and downlink data in real time, so as to ensure that the state information and downlink data of the same user keep consistent at different nodes (the DU, MC and CRG).

MAC layer: MAC layers of all MCs and DUs covered by one CRG (including the MAC layer of the CRG itself) together perform the joint scheduling of users.

PHY layer: For a user that does not need the joint processing in the DU, PHY layer processing is implemented in the DU; for a user that does not need the joint processing in the MC, PHY layer processing is implemented in the MC; for users requiring performing the joint processing in one MC (including between different DUs of the MC, and between the MC and the DU), joint PHY layer processing is implemented in the MC; and for users requiring cross-MC joint processing, joint PHY layer processing is implemented in the CRG.

An uplink example of the layered air interface cloud processing according to an embodiment of the present invention is illustrated in the following:

For users that do not need the joint processing in the DU, all air interface processing thereof is implemented in the DU;

For users that do not need the joint processing in the MC, all air interface processing thereof is implemented in the MC;

For users requiring performing the joint processing in one MC (including between different DUs of the MC, and between the MC and the DU), all air interface processing is implemented in the MC, and at this time, the PHY layer of the DU needs to transmit a received PHY layer signal to the PHY layer of the MC, to perform joint processing; and For users requiring cross-MC joint processing, all air interface processing thereof is implemented in the CRG, and at this time, the PHY layer of the DU or MC needs to transmit a received PHY layer signal to the PHY layer of the CRG, to perform joint processing.

Figure 10:
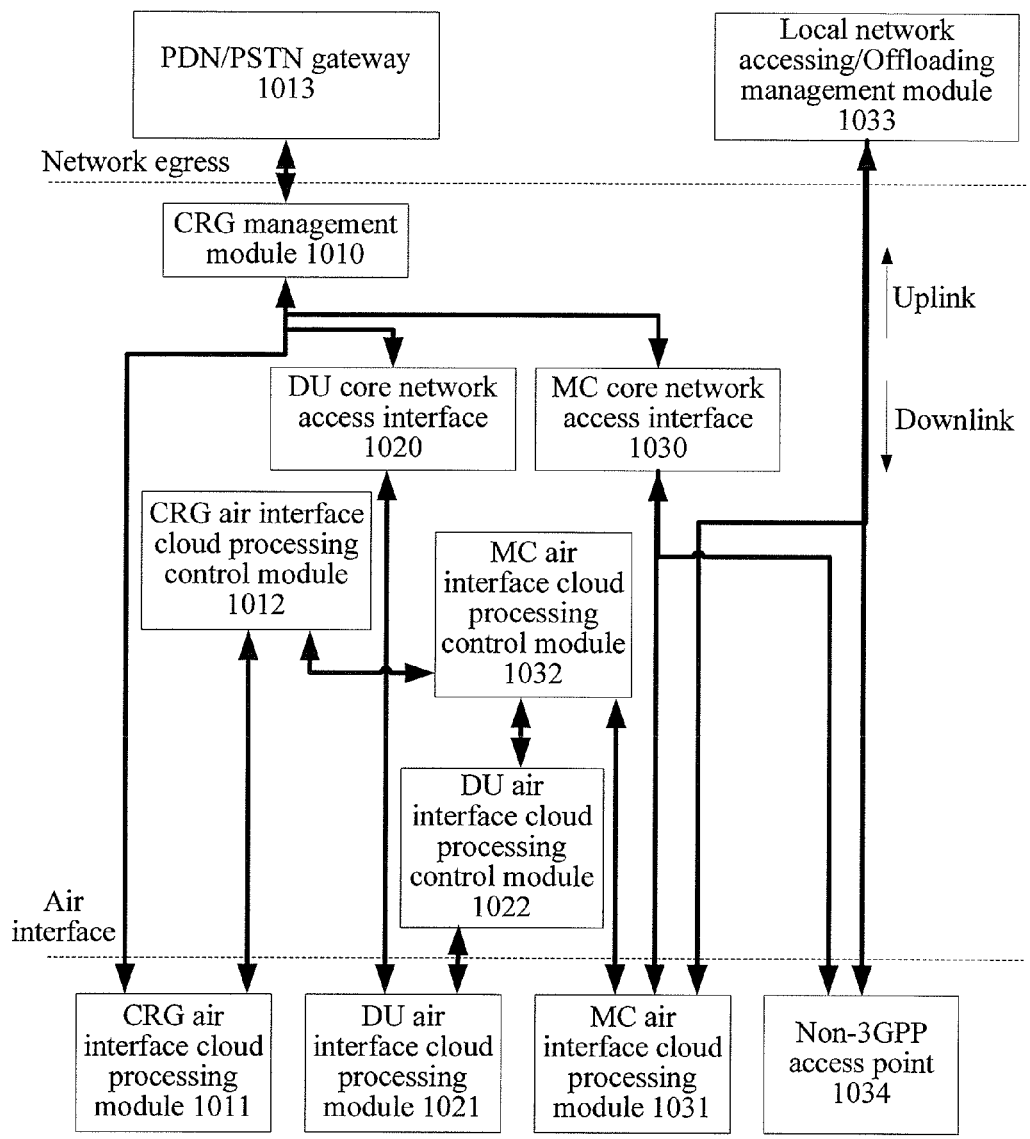
FIG. 10 is a schematic diagram of the flow direction of user plane data according to an embodiment of the present invention.

FIG. 10 is a schematic diagram of the flow direction of user plane data according to an embodiment of the present invention.

FIG. 10 shows an uplink example and a downlink example of user plane data stream among cloud computing nodes.

In the downlink example, a PDN/PSTN gateway 1013 in the CRG may receive network data from the PDN/PSTN, and transfers the network data to a CRG management module 1010.

The CRG management module 1010 may allocate the network data received from the PDN/PSTN gateway 1013. For example, the CRG management module 1010 may allocate the network data to a CRG air interface cloud processing module 1011. Optionally, the CRG management module 1010 may also allocate the network data to the MC and DU through an MC core network access interface and a DU core network access interface. Moreover, optionally, the CRG management module may also allocate the network data to another CRG. In an actual application, the CRG may determine to allocate the network data to one or more of the CRG itself, the MC, the DU and the other CRG according to multiple factors, such as the location of a user, a node computing capability, and whether to participate in a user service. When the CRG performs the joint signal processing of an air interface protocol stack with the MC, the DU or another CRG, the CRG may allocate the network data to at least one node participating in the joint signal processing, so that the at least one node performs signal processing. In the situation of non-joint signal processing, the CRG may allocate the network data to one node of the CRG itself, the MC, the DU and the other CRG.

When receiving the network data allocated by the CRG management module 1010, the CRG air interface cloud processing module 1011 may perform the signal processing of the air interface protocol stack for the received network data to generate a downlink baseband signal. The generated downlink baseband signal may be transmitted to a CRG air interface cloud processing control module 1012. The CRG air interface cloud processing control module 1012 may send the downlink baseband signal received from the CRG air interface cloud processing module 1011 to another node of the mobile cellular network, for example, send the signal to an MC air interface cloud processing control module 1032 of the MC or send the signal to a DU air interface cloud processing control module 1022 of the DU through the MC air interface cloud processing control module 1032. Moreover, optionally, the CRG air interface cloud processing control module 1012 may also send, through an air interface cloud processing control module of another CRG, the downlink baseband signal to the MC or DU in the coverage of the other CRG.

In an example, the CRG air interface cloud processing control module 1012 may also request at least one of other nodes (for example, the MC, the DU, and the other CRG) to perform the joint signal processing of an air interface protocol stack, and/or receive, from the at least another node, a request for performing of the joint signal processing of an air interface protocol stack. In this case, the CRG air interface cloud processing module 1011 performs the joint signal processing of an air interface protocol stack with the other node, for example, the CRG air interface cloud processing module 1011 may perform the joint signal processing of an air interface protocol stack together with the MC air interface cloud processing module 1031, the DU air interface cloud processing module 1021, or the CRG air interface cloud processing module of the other CRG. The joint signal processing may include performing joint processing of the same layer of a protocol of the air interface protocol stack with the other node. Specifically, the joint signal processing may include: keeping state information and data of a user, which requires joint signal processing, on an RRC layer, a PDCP layer and an RLC layer consistent with state information and data of the user on an RRC layer, a PDCP layer and an RLC layer of the other node. Moreover, the joint signal processing may further include: performing joint user scheduling on the MAC layer and the MAC layer of the other node, and/or performing joint processing on the PHY layer and the PHY layer of the other node.

In an example, the CRG air interface cloud processing control module 1012 may also request at least one of other nodes (for example, the MC, the DU, and the other CRG) to assist in performing the joint processing of the air interface protocol stack, and/or receive, from the at least one of other nodes, a request for assisting in performing the joint processing of the air interface protocol stack. If the request for assisting in performing the signal processing of the air interface protocol stack is received from the other node, the CRG air interface cloud processing module 1011 may assist the other node in performing the signal processing of the air interface protocol stack.

The MC core network access interface 1030 and the DU core network access interface 1020 each may receive network data from the CRG management module 1010, and they may send the network data to their respective air interface cloud processing modules.

The MC air interface cloud processing module 1031 and the DU air interface cloud processing module 1021 may perform the signal processing of the air interface protocol stack for the network data received by their respective core network access interfaces, respectively, so as to generate downlink baseband signals. The downlink baseband signals may be sent (for example, through an antenna) to the user.

Optionally, the MC air interface cloud processing control module 1032 may also receive the downlink baseband signal from the CRG air interface cloud processing control module 1012 or the DU air interface cloud processing control module 1022, and the downlink baseband signal may be sent to the user through the MC air interface cloud processing module 1031.

In an example, the MC air interface cloud processing control module 1032 may request at least one of other nodes (for example, the CRG air interface cloud processing control module 1012 of the CRG, and the DU air interface cloud processing control module 1022 of the DU) to perform the joint signal processing of an air interface protocol stack, and/or receive, from the at least one of other nodes, a request for performing of the joint signal processing of an air interface protocol stack. In this case, the MC air interface cloud processing module 1031 performs the joint signal processing of an air interface protocol stack with the other node, for example, the MC air interface cloud processing module 1031 may perform the joint signal processing of an air interface protocol stack together with the CRG air interface cloud processing module 1011 or the DU air interface cloud processing module 1021. The joint signal processing may include performing joint processing of the same layer of a protocol of the air interface protocol stack with the other node. Specifically, the joint signal processing may include: keeping state information and data of a user, which requires joint signal processing, on an RRC layer, a PDCP layer and an RLC layer consistent with state information and data of the user on an RRC layer, a PDCP layer and an RLC layer of the other node. Moreover, the joint signal processing may further include: performing joint user scheduling on the MAC layer and the MAC layer of the other node, and/or performing joint processing on the PHY layer and the PHY layer of the other node.

In an example, the MC air interface cloud processing control module 1032 may also request at least one of other nodes (for example, the CRG air interface cloud processing control module 1012 of the CRG, and the DU air interface cloud processing control module 1022 of the DU) to assist in performing the joint processing of the air interface protocol stack, and/or receive, from the at least one of other nodes, a request for assisting in performing the joint processing of the air interface protocol stack. If the request for assisting in performing the signal processing of the air interface protocol stack is received from the other node, the MC air interface cloud processing module 1011 may assist the other node in performing the signal processing of the air interface protocol stack.

Optionally, a non-3GPP access point 1034 in the MC may be used to transmit network data between a non-3GPP base station and the MC air interface cloud processing module 1031 or MC core network access interface 1030.

Optionally, a local network accessing/Offloading management module 1033 in the MC may also be used to transmit network data or signaling between a local or an external network and the MC air interface cloud processing module 1031 or MC core network access interface 1030.

In an example, the DU air interface cloud processing control module 1022 may receive the downlink baseband signal from the MC air interface cloud processing control module 1032 or receive the downlink baseband signal from the CRG through the MC air interface cloud processing control module 1032. The downlink baseband signal may be sent to the user through the DU air interface cloud processing module 1021.

In an example, the DU air interface cloud processing control module 1022 may also request at least one of other nodes (for example, the MC air interface cloud processing control module 1032 of the MC, the CRG air interface cloud processing control module 1012 through the MC air interface cloud processing control module 1032) to perform the joint signal processing of an air interface protocol stack, and/or receive, from the at least one of other nodes, a request for performing of the joint signal processing of an air interface protocol stack. In this case, the DU air interface cloud processing module 1021 performs the joint signal processing of an air interface protocol stack together with the other node, for example, the DU air interface cloud processing module 1021 may perform the joint signal processing of an air interface protocol stack together with the CRG air interface cloud processing module 1011 or the MC air interface cloud processing module 1031. The joint signal processing includes performing joint processing of the same layer of a protocol of the air interface protocol stack with the other node. Specifically, the joint signal processing may include: keeping state information and data of a user, which requires joint signal processing, on an RRC layer, a PDCP layer and an RLC layer consistent with state information and data of the user on an RRC layer, a PDCP layer and an RLC layer of the other node. Moreover, the joint signal processing may further include: performing joint user scheduling on the MAC layer and the MAC layer of the other node, and/or performing joint processing on the PHY layer and the PHY layer of the other node.

In an example, the DU air interface cloud processing control module 1022 may also request at least one of other nodes (for example, the MC air interface cloud processing control module 1032 of the MC, the CRG air interface cloud processing control module 1012 through the MC air interface cloud processing control module 1032) to assist in performing the joint processing of the air interface protocol stack, and/or receive, from the at least one of other nodes, a request for assisting in performing the joint processing of the air interface protocol stack. If the request for assisting in performing the signal processing of the air interface protocol stack is received from the other node, the DU air interface cloud processing module 1021 may assist the other node in performing the signal processing of the air interface protocol stack.

In the uplink example, the CRG air interface cloud processing control module 1012 may receive an uplink baseband signal from the other node (for example, from the MC, from the DU through the MC, from an MC or a DU in coverage of another CRG through the other CRG) and send the signal to the CRG air interface cloud processing module 1011. The CRG air interface cloud processing module 1011 may perform the signal processing of the air interface protocol stack for the uplink baseband signal to generate network data, and send the generated network data to the CRG management module 1010. The CRG management module 1010 may further forward the network data to the PDN/PSTN gateway 1013. The PDN/PSTN gateway 1013 may send the network data to the PDN/PSTN.

Optionally, the CRG management module 1010 may also receive network data from the other node (for example, from the MC core network access interface 1030, from the DU core network access interface 1020, and from the other CRG), and forward the network data to the PDN/PSTN gateway 1013, so as to send it to the PDN/PSTN.

In the uplink example, the CRG air interface cloud processing control module 1012 and the CRG air interface cloud processing module 1011 may also perform the joint signal processing with the other node or assist the other node in performing the signal processing of the air interface protocol stack, and the specific implementation thereof is similar to that described in the downlink example.

In an example, the MC air interface cloud processing module 1031 and the DU air interface cloud processing module 1021 each may perform (for example, through the antenna) the signal processing of the air interface protocol stack for the uplink baseband signal received from the user to generate network data, and they send the generated network data to their respective core network access interfaces.

The MC core network access interface 1030 and the DU core network access interface 1020 may send the network data received from their respective air interface cloud processing modules to the CRG management module 1010, respectively, so as to send the data to the PDN/PSTN subsequently through the PDN/PSTN gateway 1013.

In an example, the MC air interface cloud processing control module 1032 may send the uplink baseband signal received by the MC air interface cloud processing module 1031 from the user to the CRG air interface cloud processing control module 1012 or the DU air interface cloud processing control module 1022.

In an example, the DU air interface cloud processing control module 1022 may send the uplink baseband signal received by the DU air interface cloud processing module 1021 from the user to the MC air interface cloud processing control module 1032 or to the CRG air interface cloud processing control module 1012 through the MC air interface cloud processing control module 1032.

In the uplink example, the MC and the DU may also perform the joint signal processing with the other node or assist the other node in performing the signal processing of the air interface protocol stack, and the specific implementation is similar to that described in the downlink example.

Figure 11:
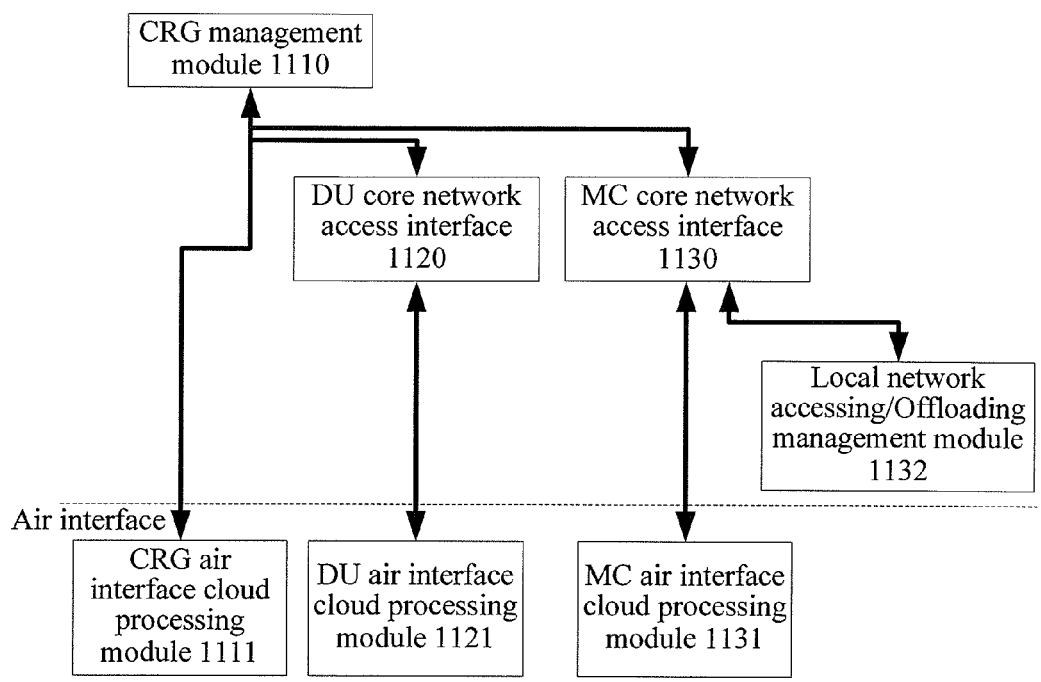
FIG. 11 is a schematic diagram of the flow direction of control plane data according to an embodiment of the present invention.

FIG. 11 is a schematic diagram of the flow direction of control plane data according to an embodiment of the present invention.

According to the present invention, the CRG management module 1110 may perform mobility management, and may also mutually transmit signaling with other node (such as, the MC, the DU, and another CRG).

In an example, the CRG management module 1110 may monitor change of a network state, the CRG air interface cloud processing module 1111 may generate corresponding signaling according to the change of the network state detected by the CRG management module 1110, and the CRG management module 1110 may send the signaling generated by the CRG air interface cloud processing module 1111 to the other node.

In another example, the CRG management module may also receive signaling from another node, for example, receive signaling from the MC core network access interface 1130 or DU core network access interface 1120, and perform local processing on the received signaling or forward the signaling.

In an embodiment, the signaling may be control plane signaling, and the control plane signaling is used to reflect the change of the network state.

In an example, the MC air interface cloud processing module 1131 and the DU air interface cloud processing module 1121 may monitor change of a user state, and generate signaling according to the change of the user state. The MC core network access interface 1130 and the DU core network access interface 1120 may send the signaling generated by their respective air interface cloud processing modules to the CRG management module 1110, respectively.

In another example, the MC core network access interface 1130 and the DU core network access interface 1120 may also receive the signaling from the CRG management module 1110, and the MC air interface cloud processing module 1131 and the DU air interface cloud processing module 1121 may also send the signaling received by their respective core network access interfaces to the user, respectively.

According to the present invention, the control plane transmission between the CRGs may be performed through the C3 interface, and the transmission between the MC or DU and the CRG may be performed through the C2-TUN interface. Moreover, the user may perform the control plane transmission with the CRG through the MC or DU, for example, the transmission may be divided into two parts, that is, the transmission from the CRG to the MC or DU may be performed through the C2-TUN interface, and the transmission from the MC or DU to the user may be performed through an air interface.

The control plane processing according to the present invention is illustrated as follows through several examples.

Example 1 relates to a situation where the cell of a user changes, and a source cell and a target cell are managed by the same CRG but managed by different DUs (or MCs), the control plane processing may include: a source DU (or MC) of the user sends a user cell handover request to the CRG management module, where the request carries the context of an air interface service of the user, and the communication here is performed through the C2-TUN interface; the CRG management module sends the user cell handover request to a target DU (or MC), where the request carries the context of an air interface service of the user, and the communication here is performed through the C2-TUN interface; the target DU (or MC) feeds back to the CRG management module whether to accept the cell handover of the user, where the communication here is performed through the C2-TUN interface; and the CRG management module feeds back to the source DU (or MC) whether to accept the cell handover of the user, where the communication here is performed through the C2-TUN interface.

Example 2 relates to a situation where the cell of a user changes, and a source cell and a target cell are managed by different CRGs, the control plane processing may include: the source DU (or MC) of the user sends a user cell handover request to the source CRG management module, where the request carries the context of an air interface service of the user, and the communication here is performed through the C2-TUN interface; the source CRG management module sends the user cell handover request to the target CRG management module, where the request carries the context of the air interface service of the user and the context of the user in the CRG management module, and the communication here is performed through the C3 interface; the target CRG management module sends the user cell handover request to a target DU (or MC), where the request carries the context of the air interface service of the user, and the communication here is performed through the C2-TUN interface; the target DU (or MC) feeds back to the target CRG management module whether to accept the cell handover of the user, where the communication here is performed through the C2-TUN interface; the target CRG management module feeds back to the source CRG management module whether to accept the cell handover of the user, where the communication here is performed through the C3 interface; and the source CRG management module feeds back to the source DU (or MC) whether to accept the cell handover of the user, where the communication here is performed through the C2-TUN interface.

Example 3 considers a situation where all control plane communication performed by the user and the CRG management module are relayed through the DU or MC node. For example, the user performing network attaching processing may include: the user sends an attach request to the CRG management module; the CRG management module requests the user for a network ID; the user informs the CRG management module of the network ID thereof; the CRG management module performs authentication on the user; and after the authentication successes, the CRG management module sends an attach success message to the user.

Embodiments of the present invention propose a new system structure of the mobile cellular network directed to layered self-adaptive cloud computing. The system structure can be completely compatible with the conventional network nodes and standards, and is capable of reusing a large number of conventional functional modules, so rapid development can be performed, and a large number of demands on throughput of a future mobile cellular network can be met with low deployment cost.

Figure 12:
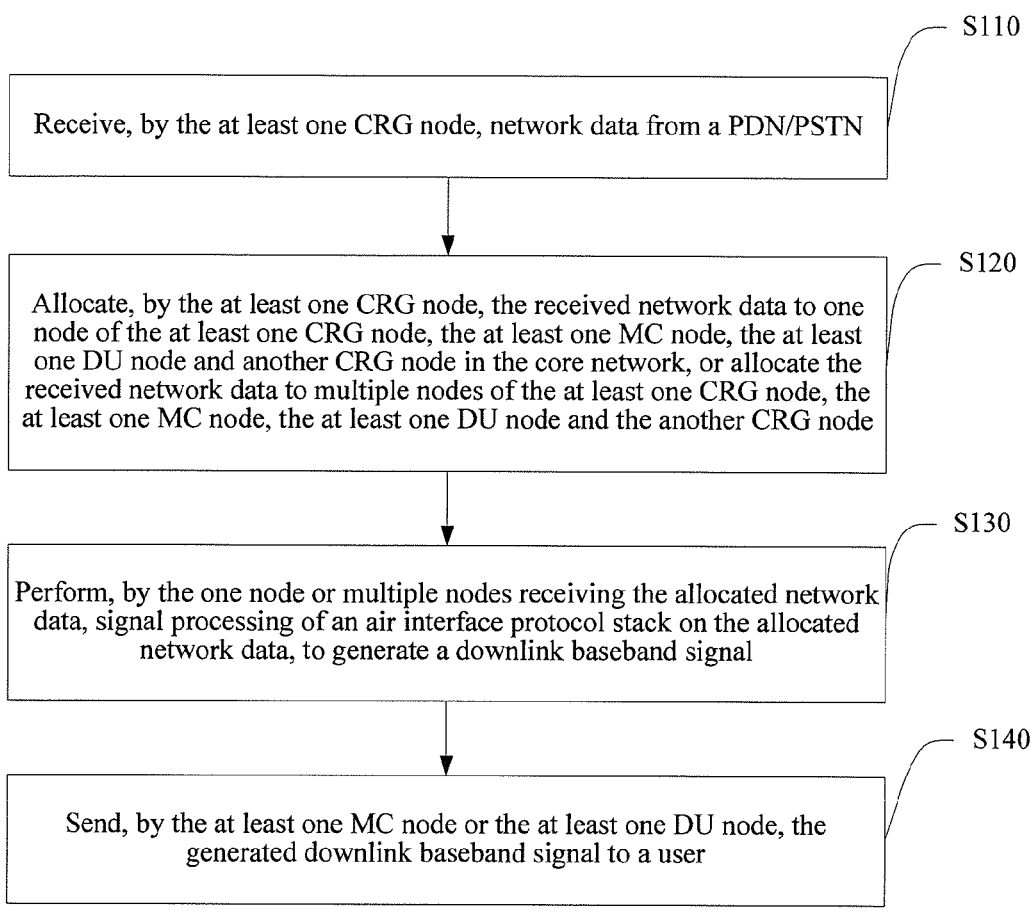
FIG. 12 is a flow chart of a downlink divergence method in a cloud computing system provided in an embodiment of the present invention.

FIG. 12 is a flow chart of a downlink divergence method in a cloud computing system provided in an embodiment of the present invention. An embodiment of the present invention further provides a downlink divergence method in a cloud computing system, where the cloud computing system comprises at least one CRG node, at least one MC node and at least one DU node, the at least one CRG node is located at the top layer in a core network of a mobile cellular network, the at least one MC node and the at least one DU node are located in an access network of the mobile cellular network, the at least one CRG node, the at least one MC node and the at least one DU node are all capable of performing cloud computing, the at least one DU node is located in coverage of the at least one MC node, the at least one MC node is located in coverage of the at least one CRG node, and the method includes:

S110: receiving, by the at least one CRG node, network data from a PDN/PSTN;

S120: allocating, by the at least one CRG node, the received network data to one node of the at least one CRG node, the at least one MC node, the at least one DU node, and another CRG node in the core network, or allocating the received network data to multiple nodes of the at least one CRG node, the at least one MC node, the at least one DU node and the other CRG node;

S130: performing, by the one node or multiple nodes receiving the allocated network data, signal processing of an air interface protocol stack on the allocated network data, so as to generate a downlink baseband signal; and S140: sending, by the at least one MC node or the at least one DU node, the generated downlink baseband signal to a user.

In an embodiment, if the at least one CRG node receives the allocated network data, the method further includes:

performing, by the at least one CRG node, signal processing of an air interface protocol stack on the allocated network data, so as to generate a downlink baseband signal;

sending, by the at least one CRG node, the generated downlink baseband signal to the at least one MC node or to the at least one DU node through the at least one MC node; and sending, by the at least one MC node or the at least one DU node, the downlink baseband signal received from the at least one CRG node to the user.

In an embodiment, the sending, by the at least one MC node or the at least one DU node, the generated downlink baseband signal to the user includes:

receiving, by the at least one MC node, the downlink baseband signal from the at least one CRG node, the other CRG node, the at least one DU node or another MC node in the access network, and send the downlink baseband signal to the user or the at least one DU node; and receiving, by the at least one DU node, the downlink baseband signal from the at least one MC node or from the at least one CRG node, the other CRG node or the other MC node through the at least one MC node, and send the downlink baseband signal to the user.

In an embodiment, the method further includes:

requesting, by any node in the at least one CRG node, the at least one MC node, the at least one DU node and the other CRG node, any other node in the at least one CRG node, the at least one MC node, the at least one DU node and the other CRG node to perform joint signal processing of an air interface protocol stack and/or receiving, from the any other node, a request about performing joint signal processing of an air interface protocol stack.

In an embodiment, the performing the signal processing of the air interface protocol stack includes:

performing, by the any node and the any other node, the joint signal processing of an air interface protocol stack.

In an embodiment, the performing the joint signal processing of an air interface protocol stack includes:

performing, by the any node and the any other node, joint processing of the same layer of a protocol of an air interface protocol stack.

In an embodiment, the joint signal processing includes: keeping state information and data of a user, which requires joint signal processing, on an RRC layer, a PDCP layer and an RLC layer of the any node consistent with state information and data of the user on an RRC layer, a PDCP layer and an RLC layer of the any other node.

In an embodiment, the joint signal processing includes: performing joint user scheduling on a MAC layer of the any node and a MAC layer of the any other node, and/or performing joint processing on a PHY layer of the any node and a PHY layer of the any other node.

In an embodiment, the method further includes:

requesting, by any node in the at least one CRG node, the at least one MC node, the at least one DU node and the other CRG node, any other node in the at least one CRG node, the at least one MC node, the at least one DU node and the other CRG node to assist in performing the signal processing of the air interface protocol stack and/or receiving, from the any other node, a request for assisting in performing the signal processing of the air interface protocol stack.

In an embodiment, the method further includes:

if the any node receives, from the any other node, the request for assisting in performing the signal processing of the air interface protocol stack, assisting the any other node in performing the signal processing of the air interface protocol stack.

According to the embodiment of the present invention, a downlink divergence method in the system structure of the mobile cellular network is proposed directed to the layered self-adaptive cloud computing. The method can be completely compatible with the conventional network nodes and standards, and is capable of reusing a large number of conventional functional modules, so rapid development can be performed, and a large number of demands on throughput of the future mobile cellular network can be met with low deployment cost.

Figure 13:
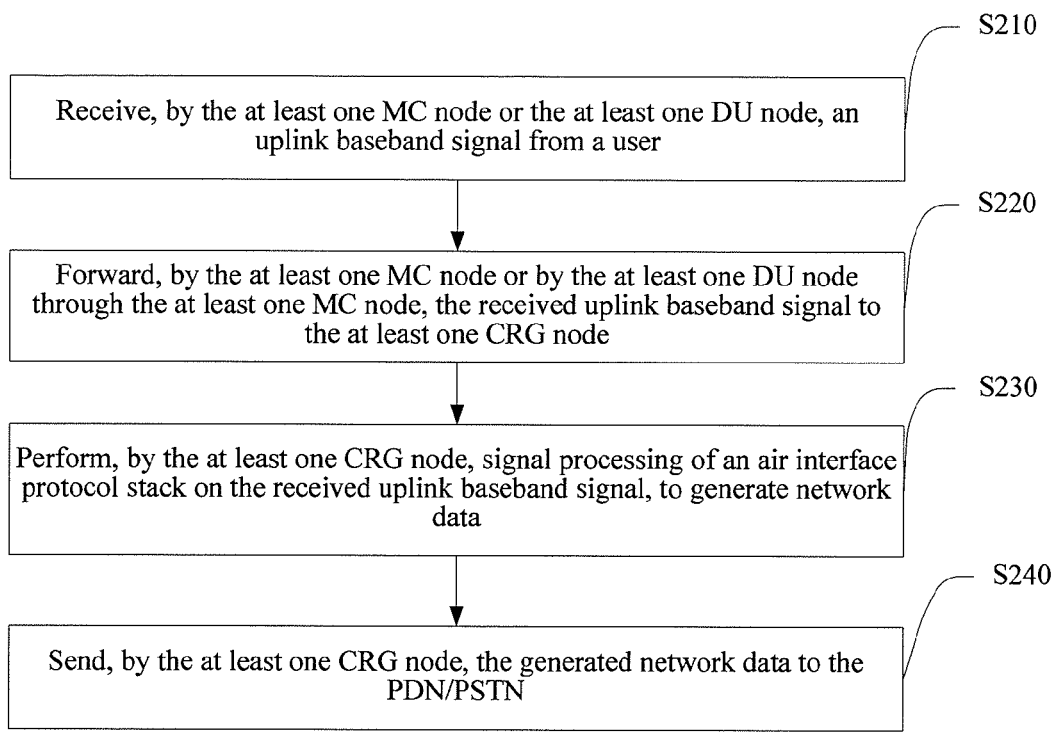
FIG. 13 is a flow chart of an uplink convergence method in a cloud computing system provided in an embodiment of the present invention.

FIG. 13 is a flow chart of an uplink convergence method in a cloud computing system provided in an embodiment of the present invention. An embodiment of the present invention further provides an uplink convergence method in a cloud computing system, where the cloud computing system comprises at least one CRG node, at least one MC node and at least one DU node, the at least one CRG node is located at the top layer in a core network of a mobile cellular network, the at least one MC node and the at least one DU node are located in an access network of the mobile cellular network, the at least one CRG node, the at least one MC node and the at least one DU node are all capable of performing cloud computing, the at least one DU node is located in coverage of the at least one MC node, the at least one MC node is located in coverage of the at least one CRG node, and the method includes:

S210: receiving, by the at least one MC node or the at least one DU node, an uplink baseband signal from a user;

S220: forwarding, by the at least one MC node or by the at least one DU node through the at least one MC node, the received uplink baseband signal to the at least one CRG node;

S230: performing, by the at least one CRG node, signal processing of an air interface protocol stack on the received uplink baseband signal, so as to generate network data; and S240: sending, by the at least one CRG node, the generated network data to the PDN/PSTN.

In an embodiment, after the at least one MC node or the at least one DU node receives the uplink baseband signal from the user, the method further includes:

performing, by the at least one MC node or the at least one DU node, signal processing of an air interface protocol stack directly on the received uplink baseband signal, so as to generate network data;

sending, by the at least one MC node or the at least one DU node, the generated network data to the at least one CRG node; and sending, by the at least one CRG node, the network data received from the at least one MC node or the at least one DU node to the PDN/PSTN.

In an embodiment, the method further includes:

requesting, by any node in the at least one CRG node, the at least one MC node, the at least one DU node, and the other CRG node in the core network, any other node in the at least one CRG node, the at least one MC node, the at least one DU node and the other CRG node to perform joint signal processing of an air interface protocol stack and/or receiving, from the any other node, a request for performing the joint signal processing of an air interface protocol stack.

In an embodiment, the performing the signal processing of the air interface protocol stack includes:

performing, by the any node and the any other node, the joint signal processing of an air interface protocol stack.

In an embodiment, the performing the joint signal processing of an air interface protocol stack includes:

performing, by the any node and the any other node, joint processing of the same layer of a protocol of an air interface protocol stack.

In an embodiment, the joint signal processing includes: keeping state information and data of a user, which requires joint signal processing, on an RRC layer, a PDCP layer and an RLC layer of the any node consistent with state information and data of the user on an RRC layer, a PDCP layer and an RLC layer of the any other node.

In an embodiment, the joint signal processing includes: performing joint user scheduling on a MAC layer of the any node and a MAC layer of the any other node, and/or performing joint processing on a PHY layer of the any node and a PHY layer of the any other node.

In an embodiment, the method further includes:

requesting, by any node in the at least one CRG node, the at least one MC node, the at least one DU node, and the other CRG node in the core network, any other node in the at least one CRG node, the at least one MC node, the at least one DU node and the other CRG node to assist in performing the signal processing of the air interface protocol stack and/or receiving, from the any other node, a request for assisting in performing the signal processing of the air interface protocol stack.

In an embodiment, the method further includes:

if the any node receives, from the any other node, the request for assisting in performing the signal processing of the air interface protocol stack, assisting the any other node in performing the signal processing of the air interface protocol stack.

According to the embodiment of the present invention, an uplink convergence method in the system structure of the mobile cellular network is proposed directed to the layered self-adaptive cloud computing. The method can be completely compatible with the conventional network nodes and standards, and is capable of reusing a large number of conventional functional modules, so rapid development can be performed, and a large number of demands on throughput of a future mobile cellular network can be met with low deployment cost.

Figure 14:
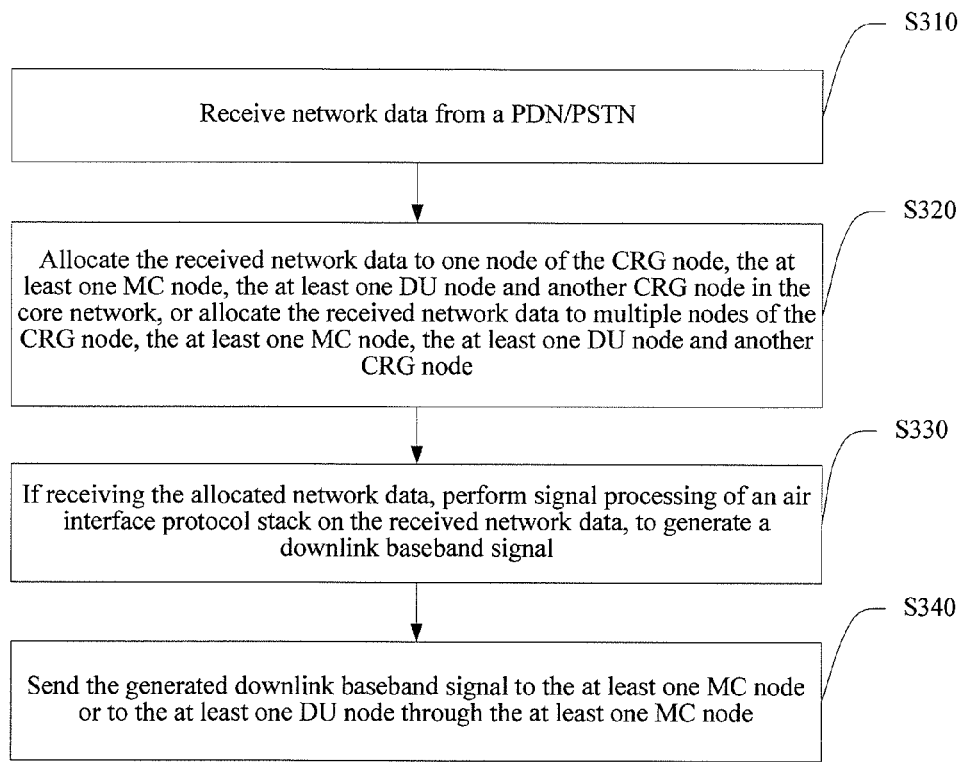
FIG. 14 is a flow chart of a downlink divergence method in a cloud radio network gateway provided in an embodiment of the present invention.

FIG. 14 is a flow chart of a downlink divergence method in a cloud radio network provided in an embodiment of the present invention. An embodiment of the present invention further provides a downlink divergence method in a CRG node, where the CRG node is located at the top layer in a core network of a mobile cellular network, the mobile cellular network further includes another CRG node located at the top layer in the core network, and at least one MC node and at least one DU node located in an access network, the at least one MC node and the at least one DU node are both capable of performing cloud computing, the at least one DU node is located in coverage of the at least one MC node, the at least one MC node is located in coverage of the CRG node, and the method includes:

S310: receiving network data from a PDN/PSTN;

S320: allocating the received network data to one node of the CRG node, the at least one MC node, the at least one DU node, and another CRG node in the core network, or allocating the received network data to multiple nodes of the CRG node, the at least one MC node, the at least one DU node and another CRG node;

S330: if receiving the allocated network data, performing signal processing of an air interface protocol stack on the received network data, so as to generate a downlink baseband signal; and S340: sending the generated downlink baseband signal to the at least one MC node or to the at least one DU node through the at least one MC node.

In an embodiment, the allocating the received network data to one node of the CRG node, the at least one MC node, the at least one DU node, and another CRG node in the core network, or allocating the received network data to multiple nodes of the CRG node, the at least one MC node, the at least one DU node and the other CRG node includes: if the CRG node performs the joint signal processing of an air interface protocol stack with at least one node in the CRG node, the at least one MC node, the at least one DU node and the other CRG node, allocating the received network data to the at least one node.

In an embodiment, the method further includes:

requesting at least one of the at least one MC node, the at least one DU node and the other CRG node to perform the joint signal processing of an air interface protocol stack, and/or receiving, from at least one of the at least one MC node, the at least one DU node and the other CRG node, a request about performing the joint signal processing of an air interface protocol stack.

In an embodiment, the performing the signal processing of the air interface protocol stack includes:

performing the joint signal processing of the air interface protocol stack with the at least one node.

In an embodiment, the performing the joint signal processing of the air interface protocol stack includes:

performing joint processing of the same layer of a protocol of an air interface protocol stack with the at least one node.

In an embodiment, the joint signal processing includes: keeping state information and data of a user, which requires joint signal processing, on an RRC layer, a PDCP layer and an RLC layer consistent with state information and data of the user on an RRC layer, a PDCP layer and an RLC layer of the at least one node.

In an embodiment, the joint signal processing includes: performing joint user scheduling on a MAC layer with a MAC layer of the at least one node, and/or performing joint processing on a PHY layer with a PHY layer of the at least one node.

In an embodiment, the method further includes:

requesting at least one of the at least one MC node, the at least one DU node and the other CRG node to assist in performing the signal processing of the air interface protocol stack, and/or receiving, from at least one of the at least one MC node, the at least one DU node and the other CRG node, a request for assisting in performing the signal processing of the air interface protocol stack.

In an embodiment, the method further includes:

assisting the at least one node in performing the signal processing of the air interface protocol stack, if the request for assisting in performing the signal processing of the air interface protocol stack is received from the at least one node.

In an embodiment, the method further includes:

sending the generated downlink baseband signal to an MC node or a DU node in coverage of the other CRG node through the other CRG node.

In an embodiment, the sending the generated downlink baseband signal to the at least one MC node or to the at least one DU node through the at least one MC node and the allocating the received network data to the one node or the multiple nodes are performed through different interfaces, respectively.

According to the embodiment of the present invention, a downlink divergence method in the system structure of the mobile cellular network is proposed directed to the layered self-adaptive cloud computing. The method can be completely compatible with the conventional network nodes and standards, and is capable of reusing a large number of conventional functional modules, so rapid development can be performed, and a large number of demands on throughput of a future mobile cellular network can be met with low deployment cost.

Figure 15:
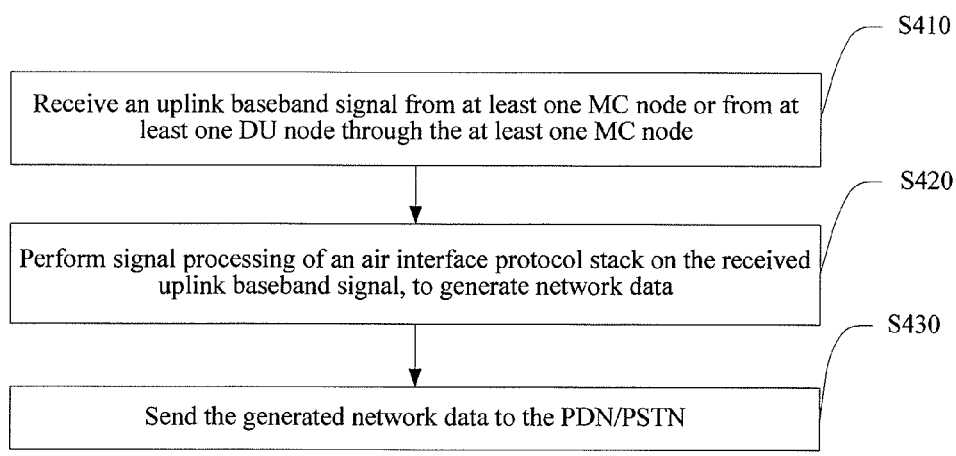
FIG. 15 is a flow chart of an uplink convergence method in a cloud radio network gateway provided in an embodiment of the present invention.

FIG. 15 is a flow chart of an uplink convergence method in a cloud radio network provided in an embodiment of the present invention. An embodiment of the present invention further provides an uplink convergence method in a CRG node, where the CRG node is located at the top layer in a core network of a mobile cellular network, the mobile cellular network further includes another CRG node located at the top layer in the core network, and at least one MC node and at least one DU node located in an access network, the at least one MC node and the at least one DU node are both capable of performing cloud computing, the at least one DU node is located in coverage of the at least one MC node, the at least one MC node is located in coverage of the CRG node, and the method includes:

S410: receiving an uplink baseband signal from the at least one MC node or from the at least one DU node through the at least one MC node;

S420: performing signal processing of an air interface protocol stack on the received uplink baseband signal, so as to generate network data; and S430: sending the generated network data to the PDN/PSTN.

In an embodiment, the method further includes:

receiving the uplink baseband signal from an MC node or a DU node in coverage of the other CRG node through the other CRG node in the core network.

In an embodiment, the method further includes:

receiving network data from one or more nodes in the at least one MC node, the at least one DU node, and the other CRG node in the core network, and forwarding the network data to the PDN/PSTN.

In an embodiment, the receiving the uplink baseband signal from the at least one MC node or from the at least one DU node through the at least one MC node and the receiving the network data from the one or more nodes are performed through different interfaces, respectively.

In an embodiment, the sending the generated network data to the PDN/PSTN further includes:

sending the generated network data to the PDN/PSTN through the other CRG node in the core network.

In an embodiment, the method further includes:

requesting at least one of the at least one MC node, the at least one DU node, and the other CRG node in the core network to perform the joint signal processing of an air interface protocol stack, and/or receiving, from at least one of the at least one MC node, the at least one DU node and the other CRG node, a request for performing the joint signal processing of an air interface protocol stack.

In an embodiment, the performing the signal processing of the air interface protocol stack includes:

performing the joint signal processing of an air interface protocol stack with the at least one node.

In an embodiment, the performing the joint signal processing of an air interface protocol stack includes:

performing joint processing of the same layer of a protocol of an air interface protocol stack with the at least one node.

In an embodiment, the joint signal processing includes: keeping state information and data of a user, which requires joint signal processing, on an RRC layer, a PDCP layer and an RLC layer consistent with state information and data of the user on an RRC layer, a PDCP layer and an RLC layer of the at least one node.

In an embodiment, the joint signal processing includes: performing joint user scheduling on a MAC layer with a MAC layer of the at least one node, and/or performing joint processing on a PHY layer with a PHY layer of the at least one node.

In an embodiment, the method further includes:

requesting at least one of the at least one MC node, the at least one DU node, and the other CRG node in the core network to assist in performing the signal processing of the air interface protocol stack, and/or receiving, from at least one of the at least one MC node, the at least one DU node and another CRG node, a request for assisting in performing the signal processing of the air interface protocol stack.

In an embodiment, the method further includes:

assisting the at least one node in performing the signal processing of the air interface protocol stack, if the request for assisting in performing the signal processing of the air interface protocol stack is received from the at least one node.

According to the embodiment of the present invention, an uplink convergence method in the system structure of the mobile cellular network is proposed directed to the layered self-adaptive cloud computing. The method can be completely compatible with the conventional network nodes and standards, and is capable of reusing a large number of conventional functional modules, so rapid development can be performed, and a large number of demands on throughput of a future mobile cellular network can be met with low deployment cost.

The descriptions of the disclosed embodiments provided in the foregoing are used to enable persons skilled in the art to implement or apply the present invention. Various modifications made to the embodiments can be easily understood by persons skilled in the art, and general principles limited here may be applicable to other embodiments without departing from the idea or scope of the present invention. Therefore, the present invention does not aim to be limited in the embodiments shown in the specification, but should cover the most broad scope consistent with the principle and inventive features disclosed in the specification.

What is claimed is:

1. A cloud computing system, comprising:
at least one cloud radio gateway (CRG) node, at least one macro cloud (MC) node and at least one distributive unit (DU) node, wherein the at least one CRG node is located at the top layer in a core network of a mobile cellular network, the at least one MC node and the at least one DU node are located in an access network of the mobile cellular network, the at least one CRG node, the at least one MC node, and the at least one DU node are all capable of performing cloud computing, the at least one DU node is located in coverage of the at least one MC node, and the at least one MC node is located in coverage of the at least one CRG node, wherein the at least one CRG node is configured to: receive network data from a public data network (PDN)/public switched telephone network (PSTN); allocate the received network data to one node of the at least one CRG node, the at least one MC node, the at least one DU node, and another CRG node in the core network, or allocate the received network data to multiple nodes of the at least one CRG node, the at least one MC node, the at least one DU node, and the other CRG node; and if receiving the allocated network data, perform signal processing of an air interface protocol stack on the allocated network data to generate a downlink baseband signal, and send the generated downlink baseband signal to the at least one MC node or to the at least one DU node through the at least one MC node;

the at least one MC node is configured to: if receiving the allocated network data, perform signal processing of an air interface protocol stack on the allocated network data to generate a downlink baseband signal, and translate the received downlink baseband signal to a radio frequency (RF) signal and send to the user, or, send the generated downlink baseband signal to the at least one DU node; and if receiving the downlink baseband signal from the at least one CRG node, the other CRG node, the at least one DU node or, another MC node in the access network, translate the received downlink baseband signal to a RF signal and send to the user, or, send the received downlink baseband signal to the at least one DU node; and the at least one DU node is configured to: if receiving the allocated network data, perform signal processing of an air interface protocol stack on the allocated network data to generate a downlink baseband signal, and translate the received downlink baseband signal to a RF signal and send to the user; and if receiving the downlink baseband signal from the at least one MC node or from the at least one CRG node, the other CRG node or the other MC node through the at least one MC node, translate the received downlink baseband signal to a RF signal and send to the user.

2. The cloud computing system according to claim 1, wherein
the at least one DU node is further configured to: receive an uplink baseband signal from the user; forward the received uplink baseband signal to the at least one MC node, or perform signal processing of an air interface protocol stack on the received uplink baseband signal to generate network data, and send the generated network data to the at least one CRG node;

the at least one MC node is further configured to: receive the uplink baseband signal from the user or the at least one DU node; forward the received uplink baseband signal to the at least one CRG node, or perform signal processing of an air interface protocol stack on the received uplink baseband signal to generate network data, and send the generated network data to the at least one CRG node; and the at least one CRG node is further configured to: perform signal processing of an air interface protocol stack on the uplink baseband signal received from the at least one MC node to generate network data; receive network data from the at least one MC node or the at least one DU node; and send the generated network data or the received network data to the PDN/PSTN.

3. The cloud computing system according to claim 1, wherein
any node in the at least one CRG node, the at least one MC node, the at least one DU node and the other CRG node requests any other node in the at least one CRG node, the at least one MC node, the at least one DU node and the other CRG node to perform joint signal processing of an air interface protocol stack and/or receive a request for performing the joint signal processing of an air interface protocol stack from the any other node.

4. The cloud computing system according to claim 3, wherein the any node and the any other node perform the joint signal processing of an air interface protocol stack.

5. The cloud computing system according to claim 4, wherein the any node and the any other node perform joint processing of a same layer of a protocol of an air interface protocol stack.

6. The cloud computing system according to claim 1, wherein
any node in the at least one CRG node, the at least one MC node, the at least one DU node and the other CRG node requests any other node in the at least one CRG node, the at least one MC node, the at least one DU node and the other CRG node to assist in performing signal processing of an air interface protocol stack and/or receive a request for assisting in performing the signal processing of the air interface protocol stack from the any other node.

7. The cloud computing system according to claim 6, wherein
if the any node receives the request for assisting in performing the signal processing of the air interface protocol stack from the any other node, the any node assists the any other node in performing the signal processing of the air interface protocol stack.

8. A downlink divergence method in a cloud computing system, wherein the cloud computing system comprises:
at least one cloud radio gateway (CRG) node, at least one macro cloud (MC) node and at least one distributive unit (DU) node, the at least one CRG node is located at the top layer in a core network of a mobile cellular network, the at least one MC node and the at least one DU node are located in an access network of the mobile cellular network, the at least one CRG node, the at least one MC node and the at least one DU node are all capable of performing cloud computing, the at least one DU node is located in coverage of the at least one MC node, and the at least one MC node is located in coverage of the at least one CRG node, the method comprising:

receiving, by the at least one CRG node, network data from a public data network (PDN)/public switched telephone network (PSTN);

allocating, by the at least one CRG node, the received network data to one node of the at least one CRG node, the at least one MC node, the at least one DU node, and another CRG node in the core network, or allocating the received network data to multiple nodes of the at least one CRG node, the at least one MC node, the at least one DU node and the other CRG node;

performing, by the one node or multiple nodes receiving the allocated network data, signal processing of an air interface protocol stack on the allocated network data, to generate a downlink baseband signal; and translating, by the at least one MC node or the at least one DU node respectively, the generated downlink baseband signal to a RF signal and sending to a user.

9. The method according to claim 8, wherein if the at least one CRG node receives the allocated network data, the method further comprises:

performing, by the at least one CRG node, signal processing of an air interface protocol stack on the allocated network data, to generate a downlink baseband signal;

sending, by the at least one CRG node, the generated downlink baseband signal to the at least one MC node or to the at least one DU node through the at least one MC node; and translating, by the at least one MC node or the at least one DU node respectively, the downlink baseband signal received from the at least one CRG node to a RF signal and sending the user.

10. The method according to claim 8, further comprising:

requesting, by any node in the at least one CRG node, the at least one MC node, the at least one DU node and the other CRG node, any other node in the at least one CRG node, the at least one MC node, the at least one DU node and the other CRG node to perform joint signal processing of an air interface protocol stack and/or receiving a request for performing the joint signal processing of an air interface protocol stack from the any other node.

11. The method according to claim 10, wherein the performing the signal processing of the air interface protocol stack comprises:

performing, by the any node and the any other node, the joint signal processing of an air interface protocol stack.

12. The method according to claim 11, wherein the performing the joint signal processing of an air interface protocol stack comprises:

performing, by the any node and the any other node, joint processing of a same layer of a protocol of an air interface protocol stack.

13. The method according to claim 8, further comprising:

requesting, by any node in the at least one CRG node, the at least one MC node, the at least one DU node and the other CRG node, any other node in the at least one CRG node, the at least one MC node, the at least one DU node and the other CRG node to assist in performing signal processing of an air interface protocol stack and/or receiving a request for assisting in performing the signal processing of the air interface protocol stack from the any other node.

14. The method according to claim 13, further comprising:

if the any node receives the request for assisting in performing the signal processing of the air interface protocol stack from the any other node, assisting the any other node in performing the signal processing of the air interface protocol stack.

15. The method according to claim 8 further comprising:

receiving, by the at least one MC node or the at least one DU node, an uplink RF signal from a user and translating into an uplink baseband signal;

forwarding, by the at least one MC node or by the at least one DU node through the at least one MC node, the translated uplink baseband signal to the at least one CRG node;

performing, by the at least one CRG node, signal processing of an air interface protocol stack on the received uplink baseband signal, to generate network data; and sending, by the at least one CRG node, the generated network data to a public data network (PDN)/public switched telephone network (PSTN).

16. The method according to claim 15, wherein after the at least one MC node or the at least one DU node translates the uplink RF signal to the uplink baseband signal, the method further comprises:

performing, by the at least one MC node or the at least one DU node, signal processing of an air interface protocol stack directly on the translated uplink baseband signal, to generate network data;

sending, by the at least one MC node or the at least one DU node, the generated network data to the at least one CRG node; and sending, by the at least one CRG node, the network data received from the at least one MC node or the at least one DU node to the PDN/PSTN.

17. A cloud radio gateway (CRG) node, located at the top layer in a core network of a mobile cellular network, wherein the mobile cellular network further comprises another CRG node located at the top layer in the core network, and at least one macro cloud (MC) node and at least one distributive unit (DU) node located in an access network, the at least one MC node and the at least one DU node are both capable of performing cloud computing, the at least one DU node is located in coverage of the at least one MC node, and the at least one MC node is located in coverage of the CRG node, the CRG node comprising:

a public data network (PDN)/public switched telephone network (PSTN) gateway, configured to receive network data from a PDN/PSTN, and/or send network data to the PDN/PSTN;

a management module, configured to allocate the network data received by the PDN/PSTN gateway to one node of the CRG node, the at least one MC node, the at least one DU node, and another CRG node in the core network or allocate the received network data to multiple nodes of the CRG node, the at least one MC node, the at least one DU node and the other CRG node, and/or forward the network data to the PDN/PSTN gateway;

an air interface cloud processing module, configured to receive the network data allocated by the management module, perform signal processing of an air interface protocol stack on the received network data to generate a downlink baseband signal, and/or configured to perform signal processing of an air interface protocol stack on an uplink baseband signal to generate network data, and send the generated network data to the management module; and an air interface cloud processing control module, configured to receive the downlink baseband signal from the air interface cloud processing module and send the downlink baseband signal to the at least one MC node or to the at least one DU node through the at least one MC node, and/or receive the uplink baseband signal from the at least one MC node or from the at least one DU node through the at least one MC node and send the uplink baseband signal to the air interface cloud processing module.

18. The node according to claim 17, wherein the management module is further configured to:

receive the network data from at least one of the at least one MC node, the at least one DU node, and the other CRG node, and forward the network data to the PDN/PSTN gateway.

19. The node according to claim 17, wherein the management module further comprises one or more functional modules which can be mapped into one or more nodes in a conventional mobile cellular network.

20. The node according to claim 17, wherein the management module is further configured to:

if the CRG node performs joint signal processing of an air interface protocol stack with at least one node of the at least one MC node, the at least one DU node and the other CRG node, allocate the network data received by the PDN/PSTN gateway to the at least one node.

21. The node according to claim 17, wherein the air interface cloud processing control module is further configured to:

request at least one of the at least one MC node, the at least one DU node and the other CRG node to perform joint signal processing of an air interface protocol stack, and/or receive a request for performing the joint signal processing of an air interface protocol stack from at least one of the at least one MC node, the at least one DU node and the other CRG node.

22. The node according to claim 21, wherein the air interface cloud processing module is further configured to:

perform the joint signal processing of an air interface protocol stack with the at least one node.

23. The node according to claim 22, wherein the joint signal processing comprises: performing joint processing of a same layer of a protocol of an air interface protocol stack with the at least one node.

24. The node according to claim 17, wherein the air interface cloud processing control module is further configured to:

request at least one of the at least one MC node, the at least one DU node and the other CRG node to assist in performing signal processing of an air interface protocol stack, and/or receive a request for assisting in performing the signal processing of the air interface protocol stack from at least one of the at least one MC node, the at least one DU node and the other CRG node.

25. The node according to claim 24, wherein the air interface cloud processing module is further configured to:

if the request for assisting in performing the signal processing of the air interface protocol stack is received from the at least one node, assisting the at least one node in performing the signal processing of the air interface protocol stack.

26. The node according to claim 17, wherein the air interface cloud processing control module is further configured to:

send the downlink baseband signal received from the air interface cloud processing module to an MC node or a DU node in coverage of the other CRG node through the other CRG node; and/or receive the uplink baseband signal from the at least one MC node or the at least one DU node in the coverage of the other CRG node through the other CRG node, and send the uplink baseband signal to the air interface cloud processing module.

27. The node according to claim 18, wherein the air interface cloud processing control module and the management module communicate with the at least one node through different interfaces, respectively.

28. The node according to claim 17, wherein the management module is further configured to monitor change of a network state, the air interface cloud processing module is further configured to generate control plane signaling according to the change of the network state, wherein the control plane signaling is used to reflect the change of the network state, and the management module is further configured to send the generated control plane signaling to the at least one MC node, the at least one DU node or the other CRG node.

* * * * *